(12) United States Patent
Matsumura et al.

(10) Patent No.: US 11,388,703 B2
(45) Date of Patent: Jul. 12, 2022

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 155 days.

(21) Appl. No.: 16/968,421

(22) PCT Filed: Feb. 8, 2018

(86) PCT No.: PCT/JP2018/004480
§ 371 (c)(1),
(2) Date: Aug. 7, 2020

(87) PCT Pub. No.: WO2019/155587
PCT Pub. Date: Aug. 15, 2019

(65) Prior Publication Data
US 2021/0368495 A1    Nov. 25, 2021

(51) Int. Cl.
*H04W 72/04* (2009.01)
*H04L 5/00* (2006.01)

(52) U.S. Cl.
CPC ....... *H04W 72/0413* (2013.01); *H04L 5/0012* (2013.01); *H04L 5/0051* (2013.01); *H04W 72/0446* (2013.01); *H04W 72/0453* (2013.01)

(58) Field of Classification Search
CPC ......... H04W 72/0413; H04W 72/0446; H04W 72/0453; H04L 5/0053; H04L 5/0094; H04L 5/0012; H04L 5/0051; H04L 5/0017; H04L 27/261; H04B 1/713; H04J 13/20; H04J 13/0074

See application file for complete search history.

(56) References Cited

U.S. PATENT DOCUMENTS

2020/0280985 A1* 9/2020 Ijaz .................. H04W 74/0833
2020/0295878 A1* 9/2020 Choi .................. H04L 5/0055
(Continued)

FOREIGN PATENT DOCUMENTS

WO    2017/052445 A1    3/2017

OTHER PUBLICATIONS

Office Action issued in the counterpart Russian Patent Application No. 2020128364/07(050463), dated May 17, 2021 (10 pages).
(Continued)

*Primary Examiner* — Brian D Nguyen
(74) *Attorney, Agent, or Firm* — Osha Bergman Watanabe & Burton LLP

(57) ABSTRACT

A terminal is disclosed including a receiver configured to receive a physical control channel (PUCCH) resource configuration; and a processor configured to use different base sequences for a PUCCH between a first hop and a second hop if the PUCCH resource configuration indicates that intra-slot frequency hopping is enabled, a starting physical resource block (PRB) that is a first PRB in the first hop, and a second hop PRB that is a first PRB in the second hop, even when the second hop PRB is equal to the starting PRB. In other aspects, a radio communication method for a terminal and a base station are also disclosed.

15 Claims, 18 Drawing Sheets

(56) References Cited

U.S. PATENT DOCUMENTS

| | | | |
|---|---|---|---|
| 2020/0329508 A1 | 10/2020 | Tirronen et al. | |
| 2021/0092732 A1* | 3/2021 | Lee | H04W 72/0486 |
| 2021/0127396 A1* | 4/2021 | Su | H04W 72/1289 |
| 2021/0136768 A1* | 5/2021 | Kang | H04B 7/0404 |
| 2021/0143948 A1* | 5/2021 | Choi | H04W 72/04 |
| 2021/0345362 A1* | 11/2021 | Kim | H04W 28/02 |

OTHER PUBLICATIONS

NTT DOCOMO, "WF on base-sequence hopping for PUCCH (updated)", 3GPP TSG RAN WG1 Meeting AH 1801 R1-1801269, Vancouver, Canada, Jan. 22-26, 2018 (4 pages0.
Huawei et al.,"Review Summary for AI 7.3.2.2. PUCCH Structure in long-duration", 3GPP TSG RAN WG1 Ad-Hoc Meeting R1-1801145, Vancouver, Canada, Jan. 22-26, 2018 (21 pages).
Intel Corproation, "Short PUCCH for UCI up to 2 bits" 3GPP TSG RAN WG1 Meeting 90bis R1-1717382, Prague, CZ, Oct. 9-13, 2017 (6 pages).
Extended European Search Report Issued in Application No. 18904785.5 dated Aug. 24, 2021 (9 pages).
International Search Report issued in PCT/JP2018/005003 dated May 1, 2018 (2 pages).
Written Opinion of the International Searching Authority issued in PCT/JP2018/005003 dated May 1, 2018 (3 pages).
NTT Docomo, Inc.; "PUCCH structure in long-duration"; 3GPP TSG RAN WG1 Meeting AH 1801, R1-1800673; Vancouver, Canada; Jan. 22-26, 2018 (5 pages).
Panasonic; "Discussion on remaining issues on PUCCH resource allocation"; 3GPP TSG RAN WG1 Meeting AH 1801, R1-1800347; Vancouver, Canada; Jan. 22-26, 2018 (5 pages).
LG Electronics; "Text proposals for short PUCCH structure"; 3GPP TSG RAN WG1 Meeting AH 1801, R1-1800375; Vancouver, Canada; Jan. 22-26, 2018 (9 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

| PUCCH LENGTH | SF | | |
|---|---|---|---|
| | NO INTRA-SLOT HOPPING | INTRA-SLOT HOPPING | |
| | | FIRST HOP | SECOND HOP |
| 4 | 2 | 1 | 1 |
| 5 | 2 | 1 | 1 |
| 6 | 3 | 1 | 2 |
| 7 | 3 | 1 | 2 |
| 8 | 4 | 2 | 2 |
| 9 | 4 | 2 | 2 |
| 10 | 5 | 2 | 3 |
| 11 | 5 | 2 | 3 |
| 12 | 6 | 3 | 3 |
| 13 | 6 | 3 | 3 |
| 14 | 7 | 3 | 4 |

FIG. 2

| SF \ φ | 0 | 1 | 2 | 3 | 4 | 5 | 6 |
|---|---|---|---|---|---|---|---|
| 2 | [0 0] | [0 1] | - | - | - | - | - |
| 3 | [0 0 0] | [0 1 2] | [0 2 1] | - | - | - | - |
| 4 | [0 0 0 0] | [0 2 0 2] | [0 0 2 2] | [0 2 2 0] | - | - | - |
| 5 | [0 0 0 0 0] | [0 1 2 3 4] | [0 2 4 1 3] | [0 3 1 4 2] | [0 4 3 2 1] | - | - |
| 6 | [0 0 0 0 0 0] | [0 1 2 3 4 5] | [0 2 4 0 2 4] | [0 3 0 3 0 3] | [0 4 2 0 4 2] | [0 5 4 3 2 1] | - |
| 7 | [0 0 0 0 0 0 0] | [0 1 2 3 4 5 6] | [0 2 4 6 1 3 5] | [0 3 6 2 5 1 4] | [0 4 1 5 2 6 3] | [0 5 3 1 6 4 2] | [0 6 5 4 3 2 1] |

FIG. 3

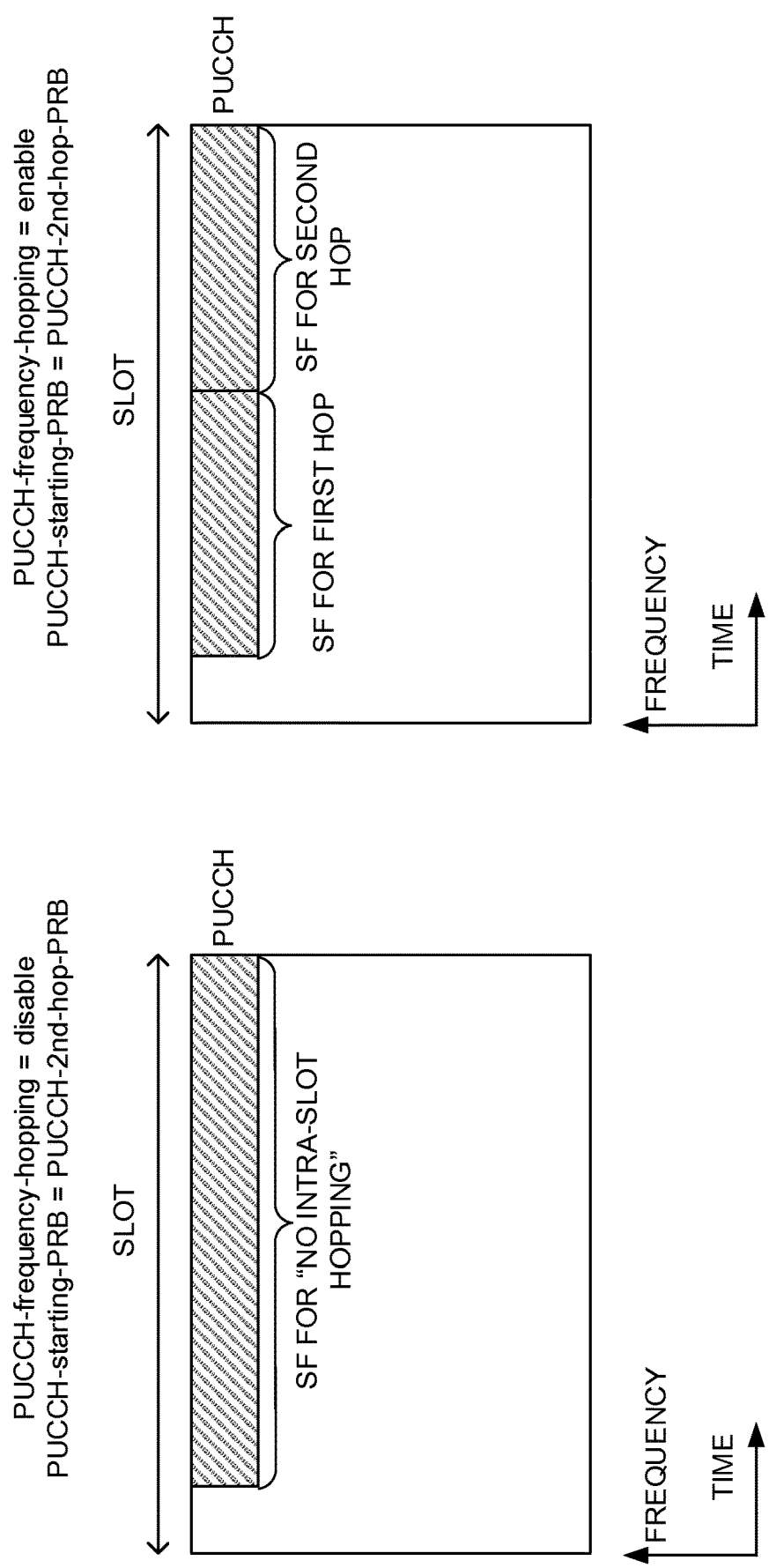

USER TERMINAL AND RADIO COMMUNICATION METHOD

TECHNICAL FIELD

The present invention relates to a user terminal and a radio communication method in the next-generation mobile communication system.

BACKGROUND ART

In the UMTS (Universal Mobile Telecommunications System) network, the specification of Long Term Evolution (LTE) has been drafted for the purpose of further increasing a high speed data rate, providing lower latency, and so on (see Non-Patent Literature 1). In addition, successor systems of LTE are also under study for the purpose of achieving further broadbandization and increased speed beyond LTE (for example, referred to as "LTE-A (LTE-Advanced)," "FRA (Future Radio Access)," "4G," "5G," "5G+(plus)," "NR (New RAT)," "LTE Rel. 14," "LTE Rel. 15 (or later versions)," and so on).

In the existing LTE systems (for example, LTE Rel. 8 to Rel. 13), downlink (DL) and/or uplink (UL) communication is performed by using a subframe of 1 ms (also referred to as a transmission time interval (TTI) or the like). The subframe is a transmission time unit of one data packet coded by channel coding and is a processing unit of scheduling, link adaptation, retransmission control (HARQ (Hybrid Automatic Repeat reQuest)), or the like.

In the existing LTE systems (for example, LTE Rel. 8 to Rel. 13), a user terminal transmits uplink control information (UCI) by using an uplink control channel (such as PUCCH (Physical Uplink Control Channel)) or an uplink data channel (such as PUSCH (Physical Uplink Shared Channel)). The format of the uplink control channel is referred to as a PUCCH format (PF) or the like.

In the existing LTE systems, the user terminal multiplexes and transmits the UL channel and the DMRS (Demodulation Reference Signal) within a TTI of 1 ms. Within a TTI of 1 ms, a plurality of DMRSs of different layers of the same user terminal (or different user terminals) are orthogonally multiplexed using cyclic shift (CS) and/or orthogonal spreading codes (orthogonal cover code (OCC)).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In the future radio communication systems (such as LTE Rel. 15, or later versions, 5G, 5G+, and NR), study has been made for determining an uplink control channel resource (e.g., PUCCH resource) on the basis of a certain field value in higher layer signaling and downlink control information (DCI) when transmitting the UCI by using an uplink control channel (e.g., PUCCH). In addition, study has been made for the PUCCH resource including a plurality of parameters.

When the user terminal does not appropriately interpret a plurality of parameters included in the determined PUCCH resource, it may be difficult to suitably transmit the PUCCH.

In view of the aforementioned problems, it is therefore an object of the present invention to provide a user terminal and a radio communication method, suitably transmitting an uplink control channel.

Solution to Problem

According to an aspect of the present invention, there is provided a user terminal including: a receiving section that receives first frequency resource information indicating a first frequency resource at a start of an uplink control channel and second frequency resource information indicating a second frequency resource after a frequency hopping timing of the uplink control channel; and a control section that controls transmission of the uplink control channel on the basis of whether or not the second frequency resource indicated in the second frequency resource information is identical to the first frequency resource indicated in the first frequency resource information.

Advantageous Effects of Invention

According to the present invention, it is possible to suitably transmit an uplink control channel in future radio communication systems.

BRIEF DESCRIPTION OF DRAWINGS

FIG. 2 is a diagram to show an example of association between a PUCCH length and an SF.

FIG. 3 is a diagram to show an example of association between an SF and a time-domain OCC.

FIGS. 4A and 4B are diagrams to show an example of a method of determining the SF according to a first aspect.

DESCRIPTION OF EMBODIMENTS

Figure 1:
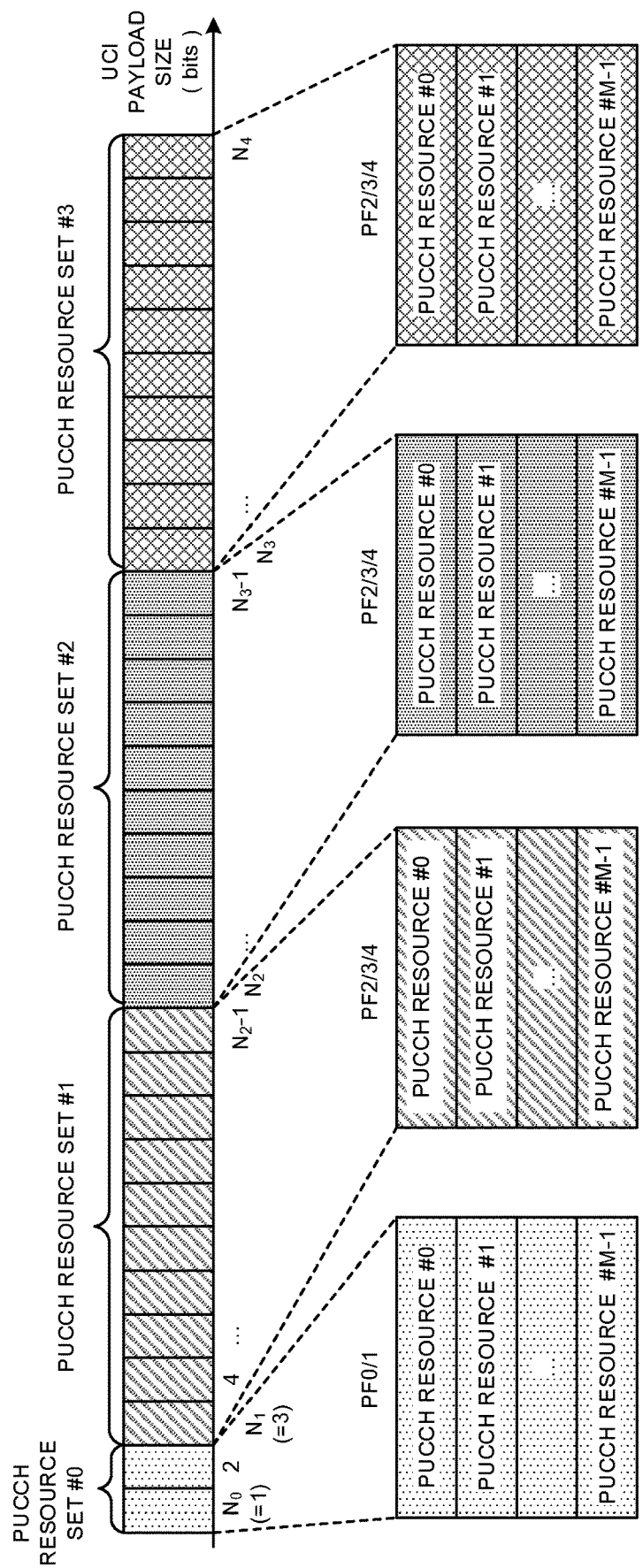
FIG. 1 is a diagram to show an example of PUCCH resource allocation.

For the future radio communication systems (such as LTE Rel. 15 or later versions, 5G, and NR), study has been made for a format of an uplink control channel (such as PUCCH) used for UCI transmission (also referred to as "PUCCH format (PF)"). For example, in LTE Rel. 15, it is discussed that five types of PUCCH formats PF0 to PF4 are supported. Note that the names of the PFs described below are merely for exemplary purposes, and other names may also be used.

For example, PF0 and PF1 are PFs used to transmit UCI of up to 2 bits (for example, also referred to as transmission acknowledgement information (HARQ-ACK (Hybrid Automatic Repeat reQuest-Acknowledge), ACK, NACK, or the like). Since PF0 can be allocated to one or two symbols, it is also referred to as "short PUCCH", "sequence-based short PUCCH", or the like. Meanwhile, since PF1 can be allocated to four to fourteen symbols, it is also referred to as "long PUCCH" or the like. In PF1, a plurality of user terminals may be multiplexed by code division multiplexing (CDM) in the same resource block (physical resource block (PRB)) through time-domain block-wise spreading using at least one of a cyclic shift (CS) and an orthogonal sequence (e.g., OCC (Orthogonal Cover Code) or time-domain OCC).

PF2 to PF4 are PFs used for transmission of UCI more than two bits (e.g., channel state information (CSI) (or CSI, HARQ-ACK, and/or scheduling request (SR)). Since PF2 can be allocated to one or two symbols, it is also referred to as "short PUCCH" or the like. Meanwhile, since PF3 and PF4 can be allocated to four to fourteen symbols, PF3 and PF4 are also referred to as "long PUCCH". In PF4, the UCI of a plurality of user terminals may be multiplexed by CDM using block-wise spreading prior to the DFT (frequency domain) by using the orthogonal sequence (such as OCC, pre-DFT OCC, and frequency-domain OCC). In PF4, the UCI of a plurality of user terminals may be multiplexed by CDM by using (frequency-domain) block-wise spreading prior to DFT using a demodulation reference signal (DMRS).

The resources used for transmission of the uplink control channel (such as PUCCH resource) are allocated using higher layer signaling and/or downlink control information (DCI). Here, the higher layer signaling may include at least one of RRC (Radio Resource Control) signaling, system information (e.g., at least one of RMSI (Remaining Minimum System Information), OSI (Other system information), MIB (Master Information Block), or SIB (System Information Block)), and broadcast information (PBCH (Physical Broadcast Channel)).

Specifically, for the user terminal, one or more sets each including one or more PUCCH resources (PUCCH resource set) are notified (configured) using the higher layer signaling. For example, "K" PUCCH resource sets (where, e.g., "1≤K≤4") may be notified from the radio base station to the user terminal. Each PUCCH resource set may contain "M" PUCCH resources (where, e.g., "4≤M≤8").

The user terminal may determine a single PUCCH resource set from the configured "K" PUCCH resource sets on the basis of a payload size of the UCI (UCI payload size). The UCI payload size may be the number of UCI bits excluding a cyclic redundancy code (CRC) bit.

The user terminal may determine the PUCCH resource used in transmission of the UCI from the "M" PUCCH resources contained in the determined PUCCH resource set on the basis of at least one of DCI and implicit information (also referred to as "implicit indication information", "implicit index", or the like).

FIG. 1 is a diagram to show an example of allocation of the PUCCH resource. In FIG. 1, as an example, it is assumed that "K=4" and four PUCCH resource sets #0 to #3 are configured by the higher layer signaling from the radio base station to the user terminal. In addition, it is assumed that each of the PUCCH resource sets #0 to #3 contains "M" PUCCH resources #0 to #M−1 (where, e.g., "4≤M≤8"). Note that the number of PUCCH resources contained in each PUCCH resource set may be equal or different.

In FIG. 1, each PUCCH resource configured in the user terminal may contain a value of at least one of the following parameters (also referred to as "field", "information", or the like). Note that each parameter may have a value range that can be given for each PUCCH format.

Symbol at which PUCCH allocation starts (start symbol or initial symbol)
  Number of symbols allocated to PUCCH within a slot (duration allocated to PUCCH)
  Index of the resource block at which allocation of PUCCH starts (start PRB or initial (lowest) PRB) (e.g., PUCCH-starting-PRB)
  Number of PRBs allocated to PUCCH (e.g., PF2 or PF3)
  Whether the frequency hopping for the PUCCH resource is enabled or disabled (e.g., PUCCH-frequency-hopping)
  Frequency resource after frequency hopping (second hop) (e.g., an index of the starting PRB or the first (lowest) PRB in the second hop, PUCCH-2nd-hop-PRB)
  Index of initial cyclic shift (CS) (e.g., for PF0 or PF1)
  Index of time-domain orthogonal sequence (such as time-domain OCC) (e.g., for PF1)
  Length of orthogonal sequence used in block-wise spreading prior to discrete Fourier transform (DFT) (such as Pre-DFT OCC) (also referred to as "Pre-DFT OCC length", "spreading factor", or the like) (e.g., for PF4)
  Index of orthogonal sequence used in block-wise spreading prior to DFT (such as Pre-DFT OCC) (e.g., for PF4)

As shown in FIG. 1, when the PUCCH resource sets #0 to #3 are configured for the user terminal, the user terminal selects any of the PUCCH resource sets on the basis of the UCI payload size.

For example, when the UCI payload size is one or two bits, the PUCCH resource set #0 is selected. When the UCI payload size is equal to or larger than three bits and equal to or smaller than $N_2$-1 bits, the PUCCH resource set #1 is selected. When the UCI payload size is equal to or larger than $N_2$ bits and equal to or smaller than $N_3$-1 bits, the PUCCH resource set #2 is selected. Similarly, when the UCI payload size is equal to or larger than $N_3$ bits and equal to or smaller than $N_3$-1 bits, the PUCCH resource set #3 is selected.

In this manner, a range of the UCI payload size in which the PUCCH resource set #i (where i=0, . . . , K−1) is selected is expressed as being equal to or larger than $N_i$ bits and equal to or smaller than $N_{i+1}-1$ bits (i.e., $\{N_i, \ldots, N_{i+1}-1\}$).

Here, start positions (start bit number) $N_0$ and $N_1$ of the UCI payload sizes for the PUCCH resource sets #0 and #1 may be set to 1 and 3, respectively. As a result, when the UCI up to two bits are transmitted, the PUCCH resource set #0 is selected. Therefore, the PUCCH resource set #0 may include the PUCCH resources #0 to #M−1 for at least one of PF0 and PF1. Meanwhile, when the UCI more than two bits is transmitted, any one of the PUCCH resource sets #1 to #3 is selected. Therefore, the PUCCH resource sets #1 to #3 may contain the PUCCH resources #0 to #M−1 for at least one of PF2, PF3, and PF1, respectively.

When "i=2, . . . , K−1", information indicating the start position $N_i$ of the UCI payload size for the PUCCH resource set (start position information) may be notified (set) to the user terminal using higher layer signaling. The start position "$N_i$" may be specific to the user terminal. For example, the start position "$N_i$" may be configured to a value having a range of 4 bits to 256 (e.g., multiples of "4"). For example, in FIG. 1, each information indicating the start positions ($N_2$ and $N_3$) of the UCI payload sizes for the PUCCH resource sets #2 and #3 is notified to the user terminal by using higher layer signaling (e.g., user-specific RRC signaling).

The maximum UCI payload size of each PUCCH resource set is given by "$N_K-1$". "$N_K$" may be explicitly notified (configured) to the user terminal using the higher layer signaling and/or the DCI or may be derived implicitly. For example, in FIG. 1, "$N_0=1$" and "$N_1=3$" may be defined in the specification, and $N_2$ and $N_3$ may be notified using higher layer signaling. In addition, "$N_4$" may be defined in the specification (e.g., $N_4=1000$).

In FIG. 1, the user terminal may determine a single PUCCH resource used in UCI transmission on the basis of a value of a certain field of the DCI and/or other parameters out of the PUCCH resources #0 to #M−1 contained in the PUCCH resource set selected on the basis of the UCI payload size. For example, when the certain field has two bits, four types of PUCCH resources can be specified. Other parameters may include the CCE index. For example, the PUCCH resource may be associated with a combination of DCI of two bits and other parameters or may be associated with DCI of three bits.

For example, when the UCI is HARQ-ACK, the user terminal (user equipment (UE)) may determine one of a plurality of PUCCH resource sets configured by the higher layer by using the UCI payload size, and may determine one PUCCH resource on the basis of the DCI and/or other parameters from the determined PUCCH resource set. The method of notifying the PUCCH resource using the PUCCH resource set described above may be used when the UCI encodes HARQ-ACK and other UCI (e.g., CSI and/or SR) and transmits them at the same time.

Meanwhile, when the UCI does not contain HARQ-ACK, the PUCCH resource may be notified without using the PUCCH resource set. For example, when the UCI is CSI and/or SR, the UE may use the PUCCH resource configured to be semi-static using the higher layer.

In PF1, the number of the user terminals multiplexed by the time-domain OCC is determined on the basis of the PUCCH duration (Long-PUCCH duration, number of symbols). The maximum number of the user terminals multiplexed by the time-domain OCC may also be referred to as "OCC multiplexing capacity", "OCC length", or "spreading factor (SF)", or the like.

When the UE multiplexing is performed using the cyclic shift (CS) in addition to the time-domain OCC, the maximum value of the multiplexing capacity in a certain resource is "maximum value of OCC multiplexing capacity×number of CS". The number of CS may be a certain value (e.g., twelve).

When the time-domain OCC is applied to a PUCCH (e.g., PF1), in order to maintain orthogonality, it is necessary to apply the same base sequence within a duration in which one time-domain OCC is multiplied. Note that a different value may be applied to the cyclic shift applied to the base sequence within a duration in which one time-domain OCC is multiplied.

As shown in FIG. 2, the SF of the time-domain OCC for PUCCH format 1 may be associated with the PUCCH length (number of PUCCH symbols). For the PUCCH length, the SF for "no intra-slot hopping" and the SF for "intra-slot hopping" may be associated with each other. When the intra-slot hopping is one time, the SF for "intra-slot hopping" may include an SF for the first hop (1st hop, before frequency hopping, hopping index m=0) and an SF for the second hop (2nd hop, after frequency hopping, hopping index m=1). In this manner, a table indicating the SF for each value of the PUCCH length may be defined in the specification.

As shown in FIG. 3, the time-domain OCC having the same number as that of the SF may be associated with the SF. Here, the time-domain OCC is expressed as "$\exp(j2\pi\varphi/SF)$", and FIG. 3 shows "$\varphi$" for determining the time-domain OCC. In this manner, a table indicating at least one time-domain OCC for each value of the SF may be defined in the specification.

An association between the PUCCH length and the SF and an association between the SF and the time-domain OCC may be configured in advance or may be defined in the specification.

Using the parameters included in the PUCCH resource, whether the frequency hopping of the PUCCH resource is enabled or disabled may be indicated, for the frequency hopping, by a higher layer parameter (e.g., PUCCH-frequency-hopping). The index of the initial PRB (lowest PRB) before frequency hopping or not applying frequency hopping may be indicated by a parameter (e.g., PUCCH-starting-PRB). The index of the initial PRB (lowest PRB) after frequency hopping may be indicated by a higher layer parameter (e.g., PUCCH-2nd-hop-PRB).

However, details of the UE operation regarding whether or not the frequency hopping is applied has not been determined. For example, the UE operation is not clear when PUCCH-starting-PRB is equal to PUCCH-2nd-hop-PRB, and PUCCH-frequency-hopping is enabled. For example, when PUCCH-starting-PRB and PUCCH-2nd-hop-PRB are notified to the UE, whether or not PUCCH-frequency-hopping is notified to the UE is not clear. In this regard, the inventors achieved the present invention by investigating the UE operation for configuration of the PUCCH frequency hopping.

Embodiments of the present invention will now be described in details. The embodiments described below may be applied alone or in combination.

First Aspect

In the first aspect, a description will be given for a method of allowing the UE to configure PUCCH-starting-PRB, PUCCH-2nd-hop-PRB, and PUCCH-frequency-hopping (or three parameters corresponding thereto) and determine the SF for PUCCH format 1 when PUCCH-starting-PRB and PUCCH-2nd-hop-PRB are equal to each other.

It is assumed that the SF for PUCCH format 1 is associated with the PUCCH length, the SF for "no intra-slot hopping" and the SF for "intra-slot hopping" are associated with the PUCCH length, and the SF for "intra-slot hopping" includes the SF for the first hop and the SF for the second hop (e.g., see FIG. 2). In addition, it is assumed that the sequence of the time-domain OCC is associated with the SF (e.g., see FIG. 3).

Note that the UE may use the SF for "intra-slot hopping" even when the frequency hopping within the PUCCH slot is not performed in practice.

The UE may determine the SF on the basis of PUCCH-starting-PRB, PUCCH-2nd-hop-PRB, and PUCCH-frequency-hopping out of the configured PUCCH resources.

When PUCCH-starting-PRB is equal to PUCCH-2nd-hop-PRB, and PUCCH-frequency-hopping is disabled, the UE may apply the SF for "no intra-slot hopping" as shown in FIG. 4A.

The SF for "no intra-slot hopping" is larger than the SF for "intra-slot hopping" (each of the SF for the first hop and the SF for the second hop). By using the SF for "no intra-slot hopping", the OCC length is lengthened (the number of OCCs increases), compared to the case where the SF for "intra-slot hopping" is used. Therefore, it is possible to increase the OCC multiplexing capacity (the maximum number of multiplexed UEs).

When PUCCH-starting-PRB is equal to PUCCH-2nd-hop-PRB, and PUCCH-frequency-hopping is enabled, the UE may apply the SF for "intra-slot hopping" as shown in FIG. 4B.

The SF for "intra-slot hopping" (each of the SF for the first hop and the SF for the second hop) is smaller than the SF for "no intra-slot hopping". By using the SF for "intra-slot hopping", the OCC length is shortened, compared to the case where the SF for "no intra-slot hopping" is used. Therefore, a signal variation within the time-domain OCC during fast movement of the UE is reduced, and the orthogonality of the time-domain OCC is not easily degraded. Accordingly, robustness for fast movement of the UE is improved.

According to the first aspect, the NW (network, e.g., radio base station, gNB) can flexibly change the SF (OCC length or OCC multiplexing capacity) using the frequency hopping configuration.

Second Aspect

In the second aspect, a description will be given for a method of allowing the UE to configure PUCCH-starting-PRB, PUCCH-2nd-hop-PRB, and PUCCH-frequency-hopping (or three parameters corresponding thereto) and determine the DMRS configuration for PUCCH format 3 and/or 4 when PUCCH-starting-PRB and PUCCH-2nd-hop-PRB are equal to each other. The DMRS configuration may be a DMRS position (e.g., symbol)

Similar to the SF, regarding the DMRS configurations for PUCCH format 3 and/or 4, a DMRS configuration for "no intra-slot hopping" and a DMRS configuration for "intra-slot hopping" may be defined in the specification.

The UE may determine the DMRS configuration on the basis of PUCCH-starting-PRB, PUCCH-2nd-hop-PRB, and PUCCH-frequency-hopping out of the configured PUCCH resources.

Figure 5A:
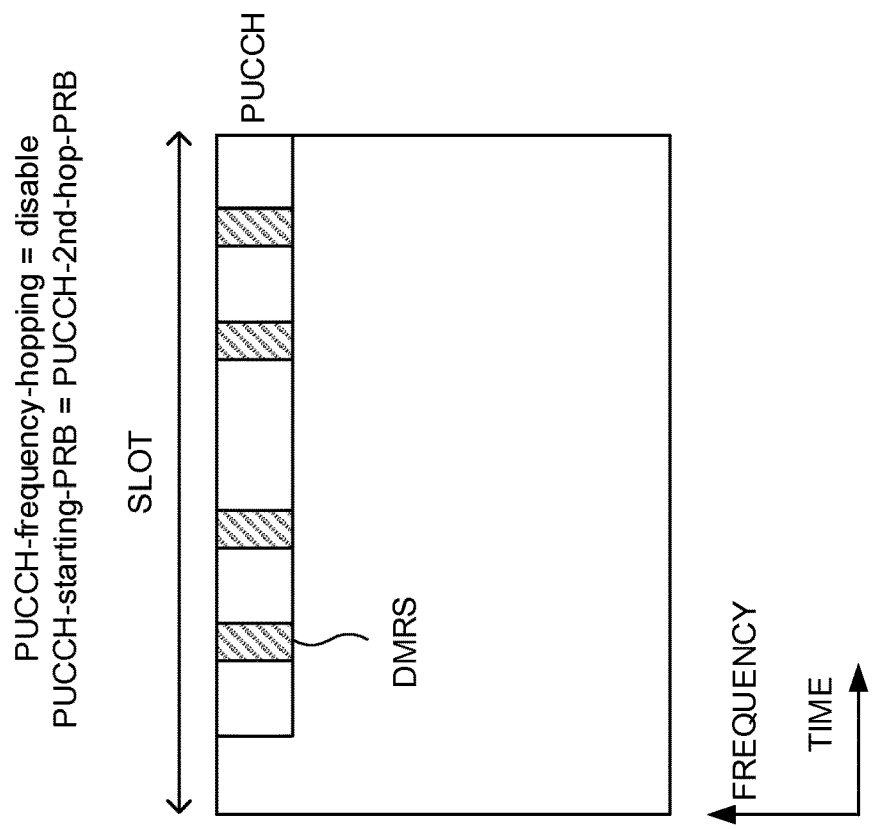
FIGS. 5A and 5B are diagrams to show an example of a method of determining a DMRS configuration according to a second aspect.

When PUCCH-starting-PRB is equal to PUCCH-2nd-hop-PRB, and PUCCH-frequency-hopping is disabled, the UE may apply the DMRS configuration for "no intra-slot hopping" as shown in FIG. 5A.

Figure 5B:
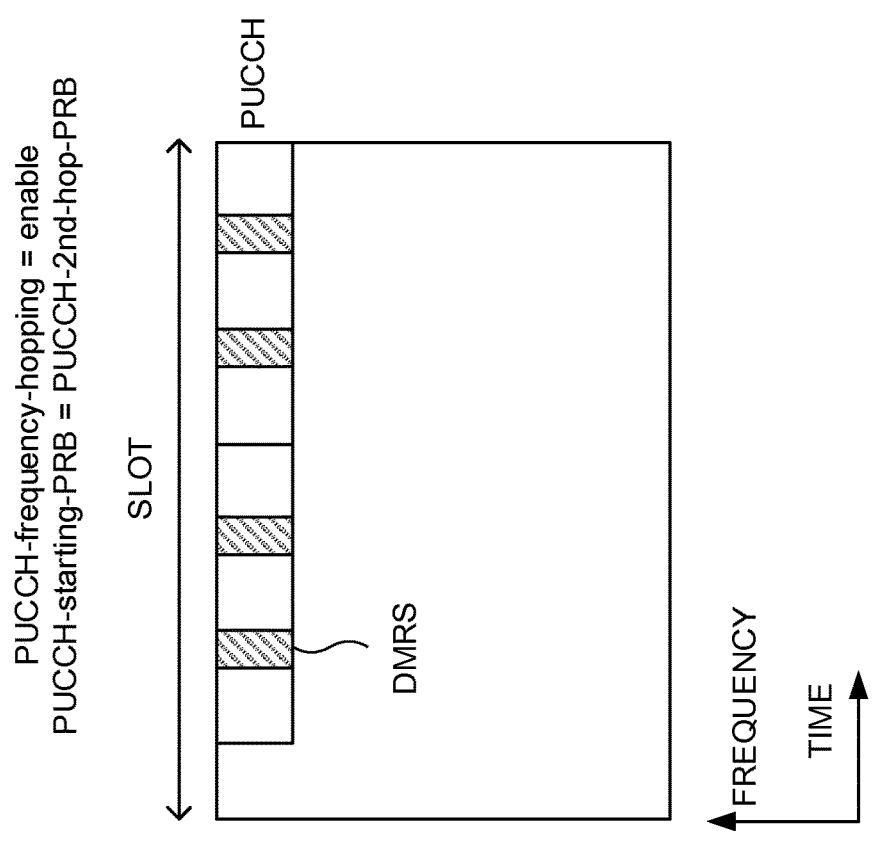

When PUCCH-starting-PRB is equal to PUCCH-2nd-hop-PRB, and PUCCH-frequency-hopping is enabled, the UE may apply the DMRS configuration for "intra-slot hopping" as shown in FIG. 5B.

Note that the DMRS position in which frequency hopping is not applied may be identical to the DMRS position in which frequency hopping is applied.

According to the second aspect, the NW can flexibly change the DMRS configuration by using the frequency hopping configuration.

Third Aspect

In the third aspect, a description will be given for a method of allowing the UE to configure PUCCH-starting-PRB, PUCCH-2nd-hop-PRB, and PUCCH-frequency-hopping (or three parameters corresponding thereto) and determine the base sequence for at least one of PUCCH formats 0 to 4 (particularly, PUCCH formats 0, 1, 3, and 4) and/or the SF for PUCCH format 1 when PUCCH-starting-PRB and PUCCH-2nd-hop-PRB are equal to each other. The base sequence may be expressed using the base sequence index.

The base sequence may be a CAZAC (Constant Amplitude Zero Auto-Correlation) sequence such as the Zadoff-Chu sequence (e.g., low-PAPR (peak-to-average power ratio) sequence, a sequence defined in the specification (e.g., low-PAPR sequence), or a pseudo spreading sequence (e.g., Gold sequence). For example, the PUCCH having a bandwidth of one PRB may use one of a certain number of sequences (for example, thirty, sixty, or a certain value determined from the base sequence length) defined in the specification as a base sequence. The base sequence may be used for either the UCI or the DMRS.

Similar to the first aspect, regarding the SF for PUCCH format 1, the SF for "no intra-slot hopping" and the SF for "intra-slot hopping" may be configured in advance or may be defined in the specification.

The UE may determine the base sequence and/or the SF on the basis of PUCCH-starting-PRB, PUCCH-2nd-hop-PRB, and PUCCH-frequency-hopping out of the configured PUCCH resources.

It is conceivable that the base sequence hopping scheme includes a base sequence hopping scheme on a slot basis (slot level) and a base sequence hopping scheme in which hopping is performed at the frequency hopping timing (on an OCC length basis) (frequency hop level or time-domain OCC level).

Aspect 3-1

In aspect 3-1, a description will be given for a case where a slot-level base sequence hopping is applied.

Figures 6A, 6B:
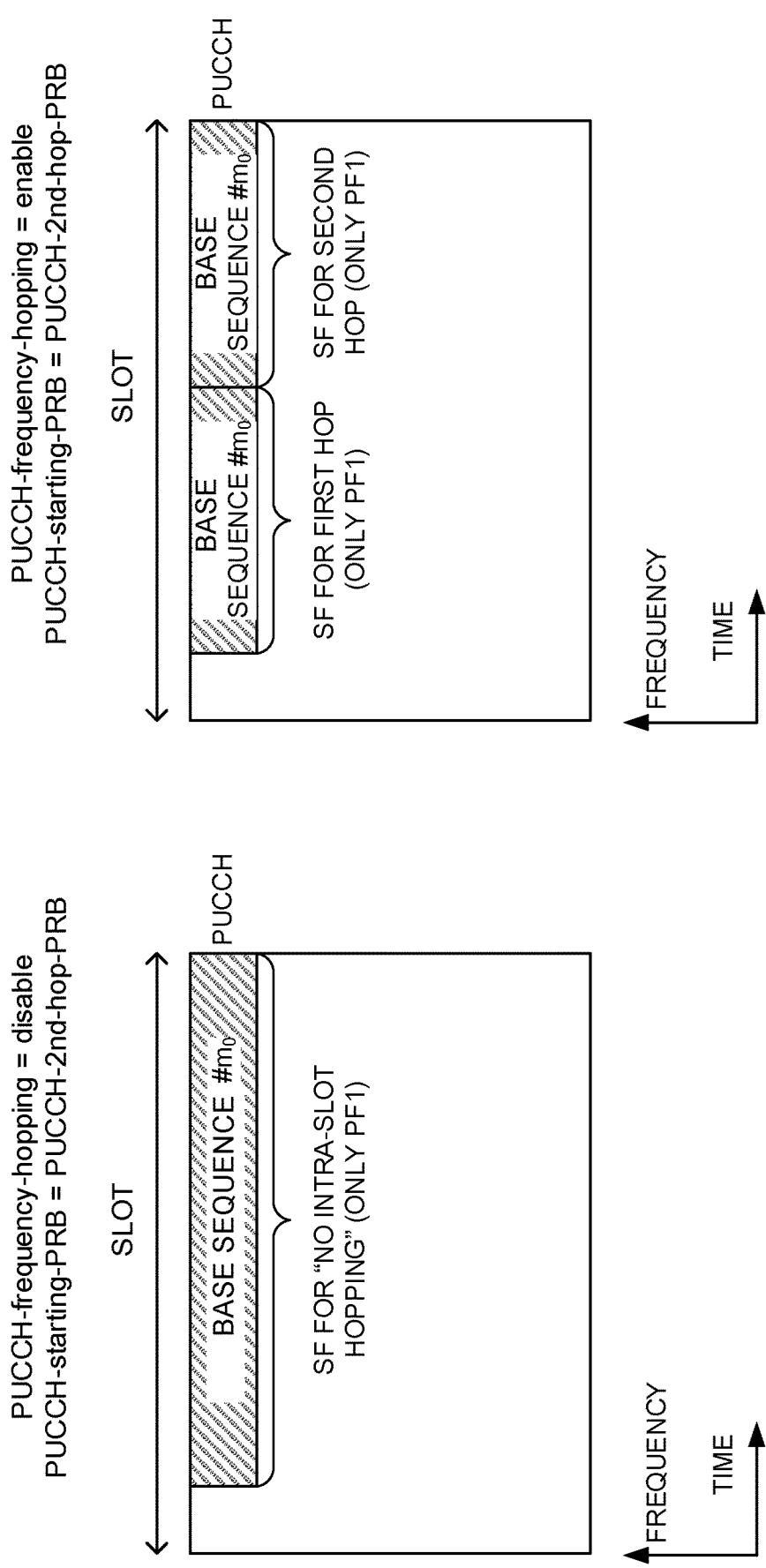
FIGS. 6A and 6B are diagrams to show an example of a method of determining a base sequence and an SF according to aspect 3-1.

When PUCCH-starting-PRB is equal to PUCCH-2nd-hop-PRB, and PUCCH-frequency-hopping is disabled, the UE may apply the SF for "no intra-slot hopping" as shown in FIG. 6A.

The SF for "no intra-slot hopping" is larger than the SF for "intra-slot hopping" (each of the SF for the first hop and the SF for the second hop). By using the SF for "no intra-slot hopping", the OCC length is lengthened (the number of OCCs increases), compared to the case where the SF for "intra-slot hopping" is used. Therefore, it is possible to increase the OCC multiplexing capacity (the multiplexing capacity, the maximum number of the multiplexed UEs).

When PUCCH-starting-PRB is equal to PUCCH-2nd-hop-PRB, and PUCCH-frequency-hopping is enabled, the UE may apply the SF for "intra-slot hopping" as shown in FIG. 6B.

The SF for "intra-slot hopping" (each of the SF for the first hop and the SF for the second hop) is smaller than the SF for "no intra-slot hopping". By using the SF for "intra-slot hopping", the OCC length is shortened, compared to the case where the SF for "no intra-slot hopping" is used. Therefore, a signal variation within the time-domain OCC during fast movement of the UE is reduced, and the orthogonality of the time-domain OCC is not easily degraded. Accordingly, robustness for fast movement of the UE is improved.

The UE uses one base sequence within one slot regardless of whether PUCCH-frequency-hopping is enabled or disabled. In other words, the base sequence does not change before and after the frequency hopping timing.

According to aspect 3-1, the NW can flexibly change the SF (OCC length) depending on whether PUCCH-frequency-hopping is enabled or disabled.

Aspect 3-2

In aspect 3-2, a case where base sequence hopping of a frequency hop level is applied will be described.

Note that the UE may perform base sequence hopping at the frequency hopping timing even when the PUCCH frequency hopping is not performed in practice.

Figure 7B:
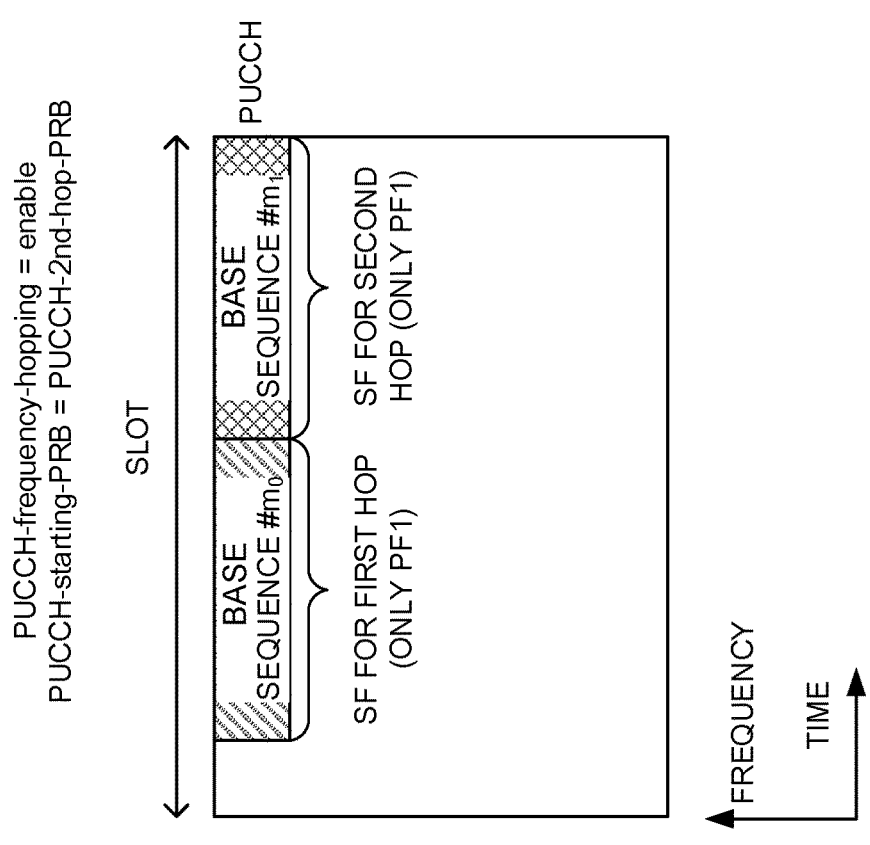
FIGS. 7A and 7B are diagrams to show an example of a method of determining the base sequence and the SF according to aspect 3-2.
Figure 7A:
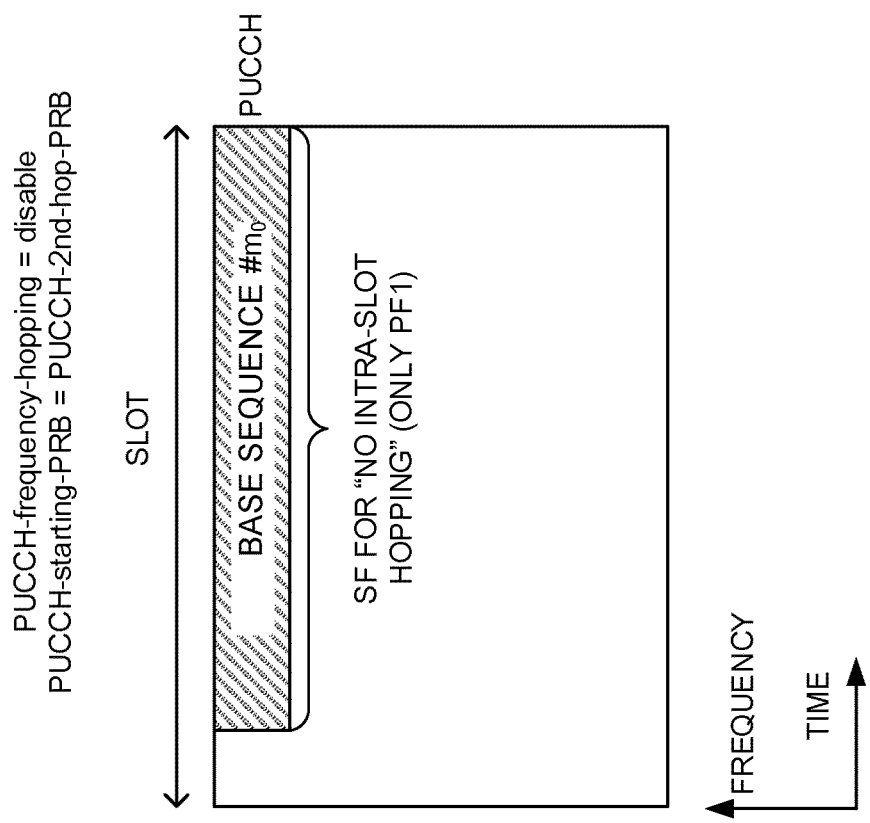

When PUCCH-starting-PRB is equal to PUCCH-2nd-hop-PRB, and PUCCH-frequency-hopping is disabled, the UE may apply the SF for "no intra-slot hopping" as shown in FIG. 7A.

The SF for "no intra-slot hopping" is larger than the SF for "intra-slot hopping" (each of the SF for the first hop and the SF for the second hop). By using the SF for "no intra-slot hopping", the OCC length is lengthened (the number of OCCs increases), compared to the case where the SF for "intra-slot hopping" is used. Therefore, it is possible to increase the OCC multiplexing capacity (the multiplexing capacity, the maximum number of the multiplexed UEs).

When PUCCH-frequency-hopping is disabled, the UE does not perform frequency hopping. Therefore, the base sequence hopping of the frequency hop level is not performed. Accordingly, the UE uses one base sequence within one slot.

When PUCCH-starting-PRB is equal to PUCCH-2nd-hop-PRB, and PUCCH-frequency-hopping is enabled, the UE may apply the SF for "intra-slot hopping" as shown in FIG. 7B.

The SF for "intra-slot hopping" (each of the SF for the first hop and the SF for the second hop) is smaller than the SF for "no intra-slot hopping". By using the SF for "intra-slot hopping", the OCC length is shortened, compared to the case where the SF for "no intra-slot hopping" is used. Therefore, a signal variation within the time-domain OCC during fast movement of the UE is reduced, and the orthogonality of the time-domain OCC is not easily degraded. Accordingly, robustness for fast movement of the UE is improved.

When PUCCH-frequency-hopping is enabled, the UE performs frequency hopping. Therefore, base sequence hopping is performed for at least one of PUCCH formats 0 to 4 at the frequency hopping timing (the base sequence is changed).

Since the base sequence is changed within a slot, for example, a probability that a plurality of UEs use different base sequences increases at least before or after the frequency hopping (base sequence hopping). Therefore, a probability of interference of the base sequence is reduced, and robustness for inter-cell interference is improved.

According to the third aspect, the NW can flexibly change the SF using the frequency hopping configuration. In addition, the UE can suitably control the base sequence hopping on the basis of the frequency hopping configuration.

Since it is desirable that the same base sequence is used within one time-domain OCC, the slot-level or frequency-hop-level base sequence hopping is applied. Meanwhile, since the orthogonality of the time-domain OCC is not influenced even by changing the cyclic shift within one time-domain OCC, symbol-based hopping (symbol level) may be applied to the cyclic shift. Similar to the base sequence, the slot-level hopping or the frequency-hop-level cyclic shift hopping may be applied.

Fourth Aspect

In the fourth aspect, a method of reducing higher layer parameters regarding frequency hopping for at least one of PUCCH formats 0 to 4 will be described.

The UE may determine whether or not the PUCCH frequency hopping is enabled on the basis of PUCCH-starting-PRB or PUCCH-2nd-hop-PRB out of the configured PUCCH resources. In other words, the PUCCH-frequency-hopping may not be notified to the UE.

Figure 8B:
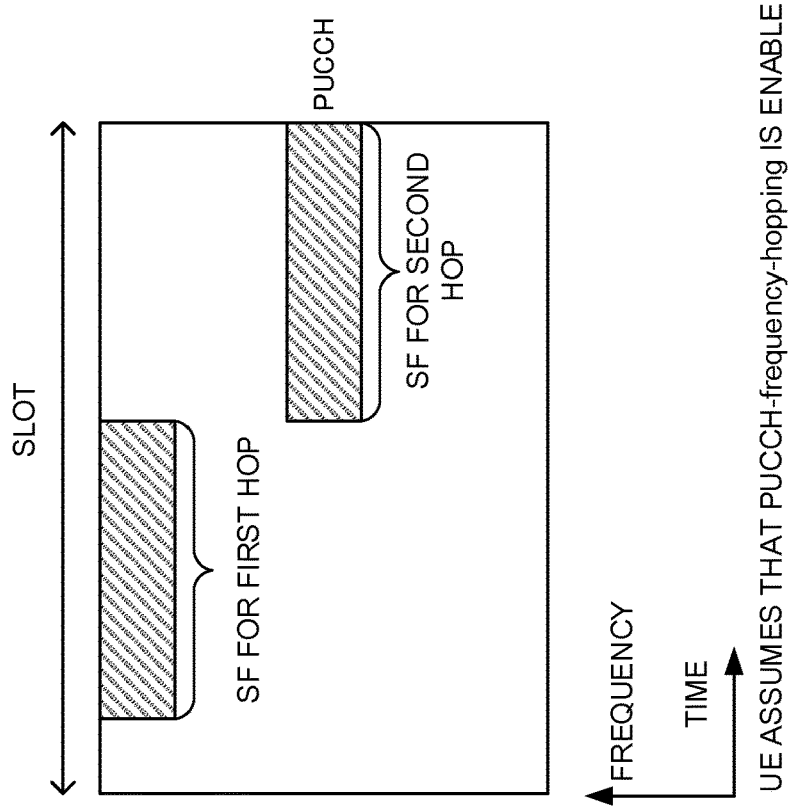
FIGS. 8A and 8B are diagrams to show an example of a method of determining the SF according to a fourth aspect.
Figure 8A:
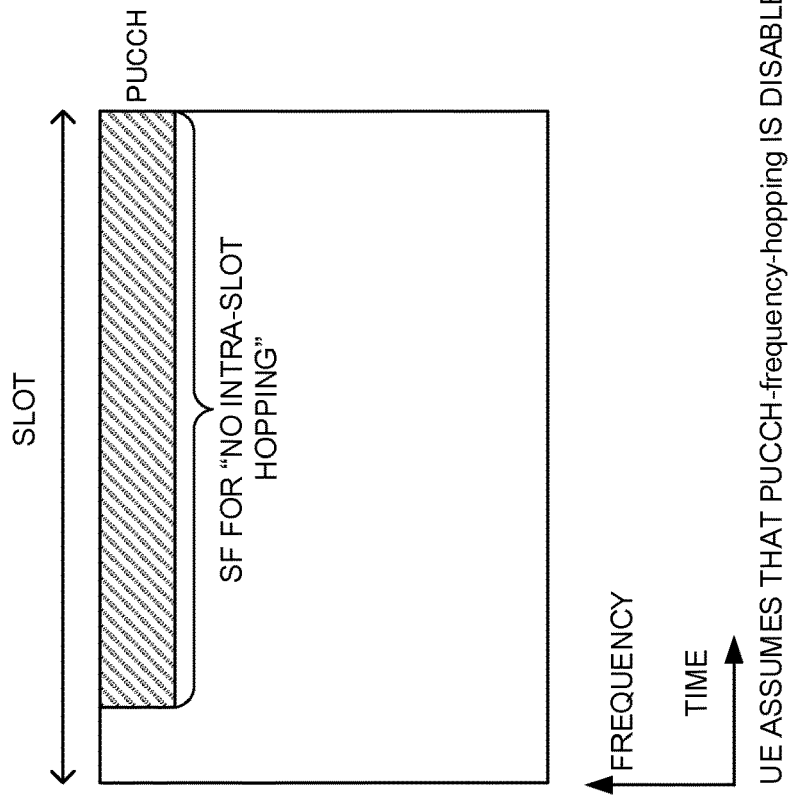

When PUCCH-starting-PRB and PUCCH-2nd-hop-PRB are configured to be equal to each other, the UE may assume that PUCCH-frequency-hopping is disabled as shown in FIG. 8A.

For example, the UE may determine at least one of the SF, the DMRS configuration, and the base sequence for a case where PUCCH-frequency-hopping is disabled according to at least one of the first, second, and third aspects.

When PUCCH-starting-PRB and PUCCH-2nd-hop-PRB are configured to be different from each other, the UE may assume that PUCCH-frequency-hopping is enabled as shown in FIG. 8B.

For example, the UE may determine at least one of the SF, the DMRS configuration, and the base sequence for a case where PUCCH-frequency-hopping is enabled according to at least one of the first, second, and third aspects.

According to the fourth aspect, since the NW does not notify the UE of a higher layer parameter indicating whether the PUCCH frequency hopping is enabled or disabled (e.g., PUCCH-frequency-hopping), it is possible to reduce the higher layer parameters and simplify the UE operation.

Fifth Aspect

In the fifth aspect, a description will be given for a method of allowing the UE to determine the SF (OCC length) for PUCCH format 1 on the basis of PUCCH-starting-PRB and PUCCH-2nd-hop-PRB when at least PUCCH-starting-PRB and PUCCH-2nd-hop-PRB (or two parameters corresponding thereto) are configured.

Figure 9B:
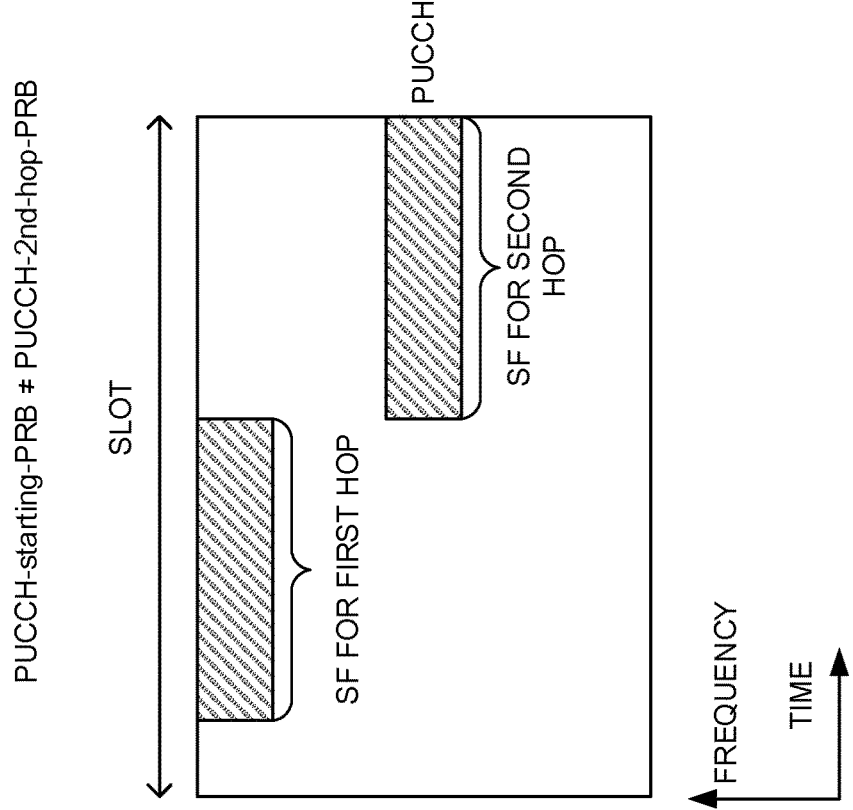
FIGS. 9A and 9B are diagrams to show an example of a method of determining the SF according to a fifth aspect.
Figure 9A:
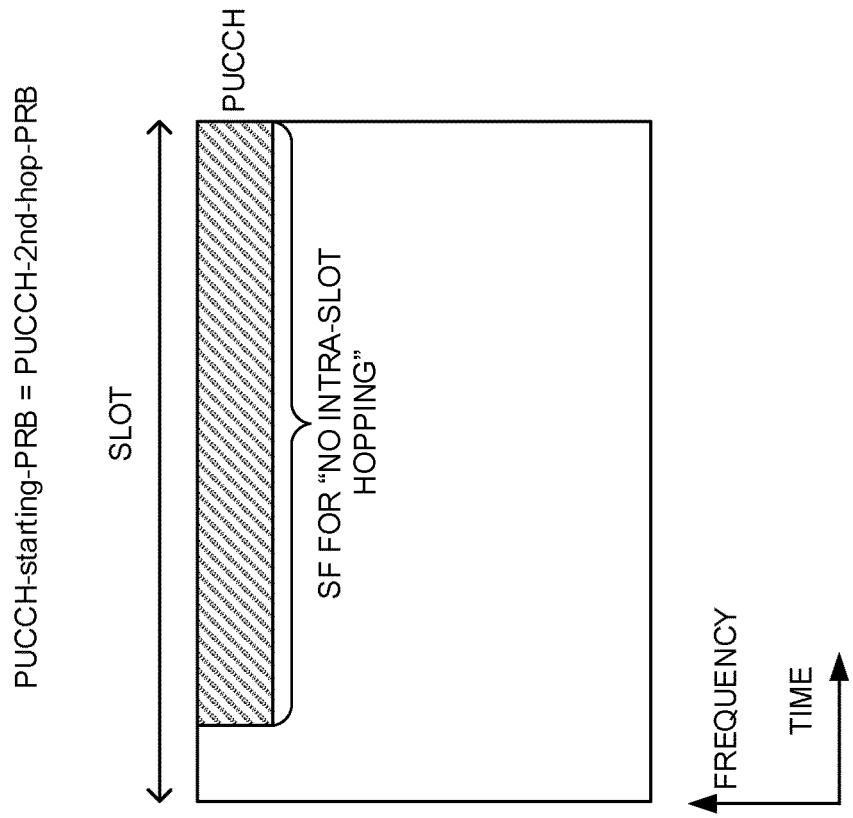

When PUCCH-starting-PRB and PUCCH-2nd-hop-PRB are configured to be equal to each other, the UE may apply the SF for "no intra-slot hopping" regardless of whether PUCCH-frequency-hopping is enabled or disabled as shown in FIG. 9A.

The SF for "no intra-slot hopping" is larger than the SF for "intra-slot hopping" (each of the SF for the first hop and the SF for the second hop). By using the SF for "no intra-slot hopping", the OCC length is lengthened (the number of OCCs increases), compared to the case where the SF for "intra-slot hopping" is used. Therefore, it is possible to increase the OCC multiplexing capacity (the multiplexing capacity, the maximum number of the multiplexed UEs).

When PUCCH-starting-PRB and PUCCH-2nd-hop-PRB are configured to be different from each other, the UE may apply the SF for "intra-slot hopping" as shown in FIG. 9B.

The SF for "intra-slot hopping" (each of the SF for the first hop and the SF for the second hop) is smaller than the SF for "no intra-slot hopping". By using the SF for "intra-slot hopping", the OCC length is shortened, compared to the case where the SF for "no intra-slot hopping" is used. Therefore, a signal variation within the time-domain OCC during fast movement of the UE is reduced, and the orthogonality of the time-domain OCC is not easily degraded. Accordingly, robustness for fast movement of the UE is improved.

The UE can obtain a frequency diversity gain by performing PUCCH frequency hopping within a slot.

When PUCCH-starting-PRB and PUCCH-2nd-hop-PRB are configured to be different from each other, the UE may assume that PUCCH-frequency-hopping is not configured to "disabled" (configured to "enabled"). In addition, when PUCCH-starting-PRB and PUCCH-2nd-hop-PRB are configured to be different from each other, the UE may apply the SF for "intra-slot hopping" regardless of whether PUCCH-frequency-hopping is enabled or disabled.

According to the fifth aspect, the NW can flexibly change the SF by using the frequency hopping setting.

The NW may not notify the UE of the higher layer parameter indicating whether the PUCCH frequency hopping is enabled or disabled (e.g., PUCCH-frequency-hopping). In this case, it is possible to reduce the higher layer parameters and simplify the UE operation.

Sixth Aspect

In the sixth aspect, a description will be given for a method of allowing the UE to determine the DMRS configuration for PUCCH formats 3 and/or 4 on the basis of PUCCH-starting-PRB and PUCCH-2nd-hop-PRB when at least PUCCH-starting-PRB and PUCCH-2nd-hop-PRB (or two parameters corresponding thereto) are configured.

Similar to the SF, regarding the DMRS configurations for PUCCH formats 3 and/or 4, the DMRS configuration for "no intra-slot hopping" and the DMRS configuration for "intra-slot hopping" may be defined in the specification.

The UE may determine the DMRS configuration on the basis of PUCCH-starting-PRB and PUCCH-2nd-hop-PRB out of the configured PUCCH resources.

Figure 10B:
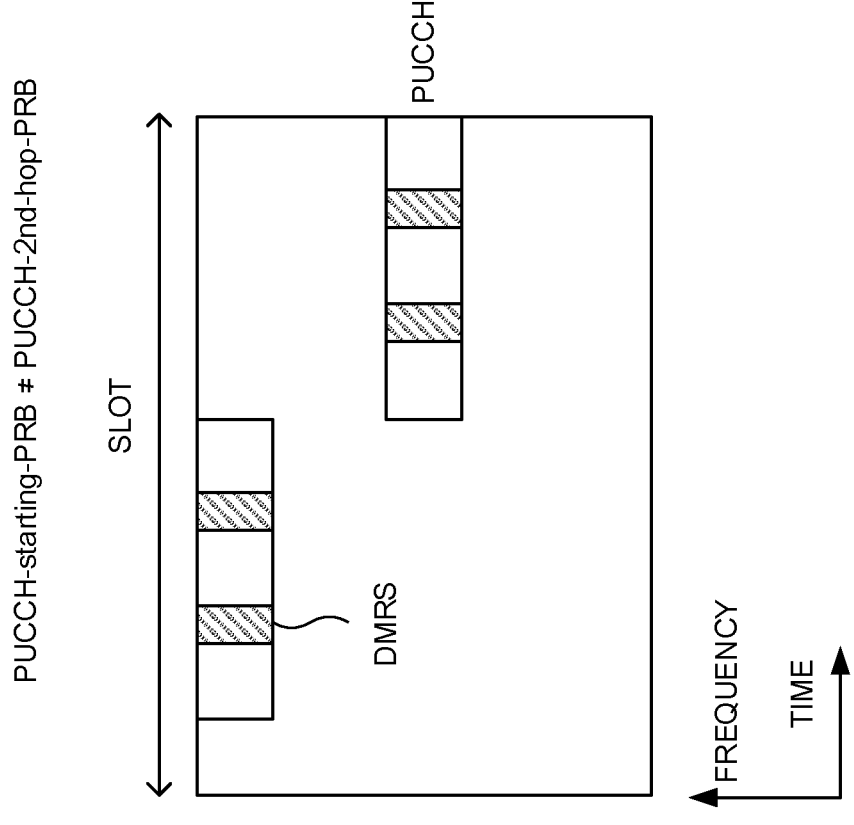
FIGS. 10A and 10B are diagrams to show an example of a method of determining a DMRS configuration according to a sixth aspect.
Figure 10A:
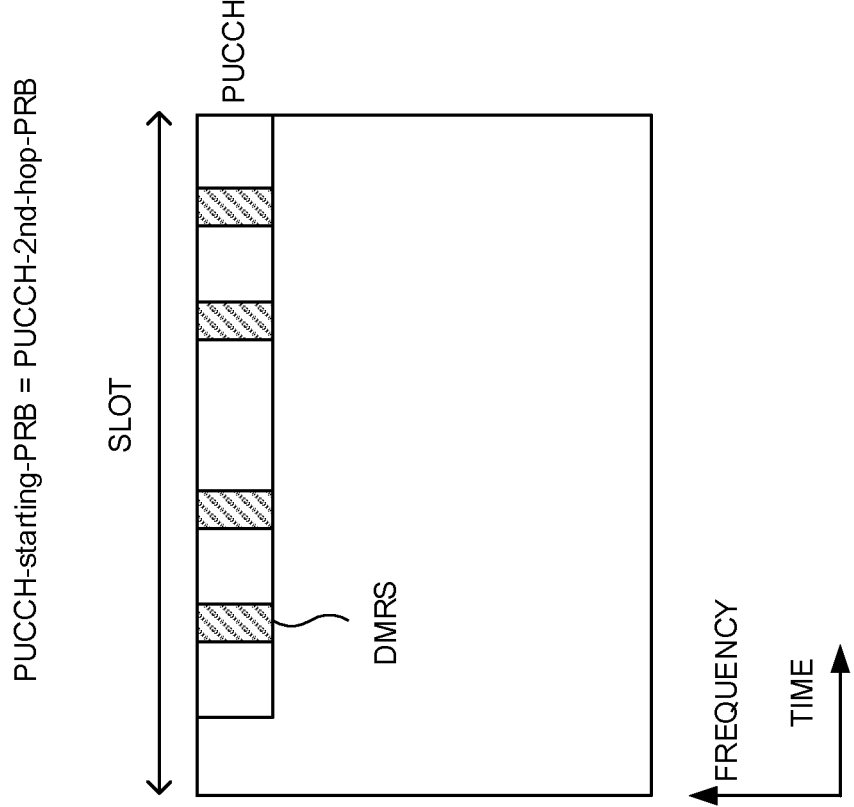

When PUCCH-starting-PRB and PUCCH-2nd-hop-PRB are configured to be equal to each other, the UE may apply the DMRS configuration for "no intra-slot hopping" regardless of whether PUCCH-frequency-hopping is enabled or disabled as shown in FIG. 10A.

When PUCCH-starting-PRB and PUCCH-2nd-hop-PRB are configured to be different from each other, the UE may apply the DMRS configuration for "intra-slot hopping" as shown in FIG. 10B.

When PUCCH-starting-PRB and PUCCH-2nd-hop-PRB are configured to be different from each other, the UE may assume that PUCCH-frequency-hopping is not configured to "disabled" (configured to "enabled"). In addition, the UE may apply the DMRS configuration for "intra-slot hopping" regardless of whether PUCCH-frequency-hopping is enabled or disabled when PUCCH-starting-PRB and PUCCH-2nd-hop-PRB are configured to be different from each other.

Note that the DMRS position for a case where frequency hopping is not applied may be identical to the DMRS position for a case where frequency hopping is applied.

According to the sixth aspect, the NW can flexibly change the DMRS configuration by using the frequency hopping configuration.

The NW may not notify the UE of a higher layer parameter indicating whether the PUCCH frequency hopping is enabled or disabled (e.g., PUCCH-frequency-hopping). In this case, it is possible to reduce the higher layer parameters and simplify the UE operation.

Seventh Aspect

In the seventh aspect, a description will be given for a method of allowing the UE to determine the base sequence for at least one of PUCCH formats 0 to 4 (particularly, PUCCH formats 0, 1, 3, and 4) and/or the SF for PUCCH format 1 on the basis of PUCCH-starting-PRB and PUCCH-2nd-hop-PRB when at least PUCCH-starting-PRB and PUCCH-2nd-hop-PRB (or two parameters corresponding thereto) are configured.

The UE may determine the base sequence and/or the SF on the basis of PUCCH-starting-PRB and PUCCH-2nd-hop-PRB out of the configured PUCCH resources.

Aspect 7-1

In aspect 7-1, a case where a slot-level base sequence hopping is applied will be described.

Figures 11A, 11B:
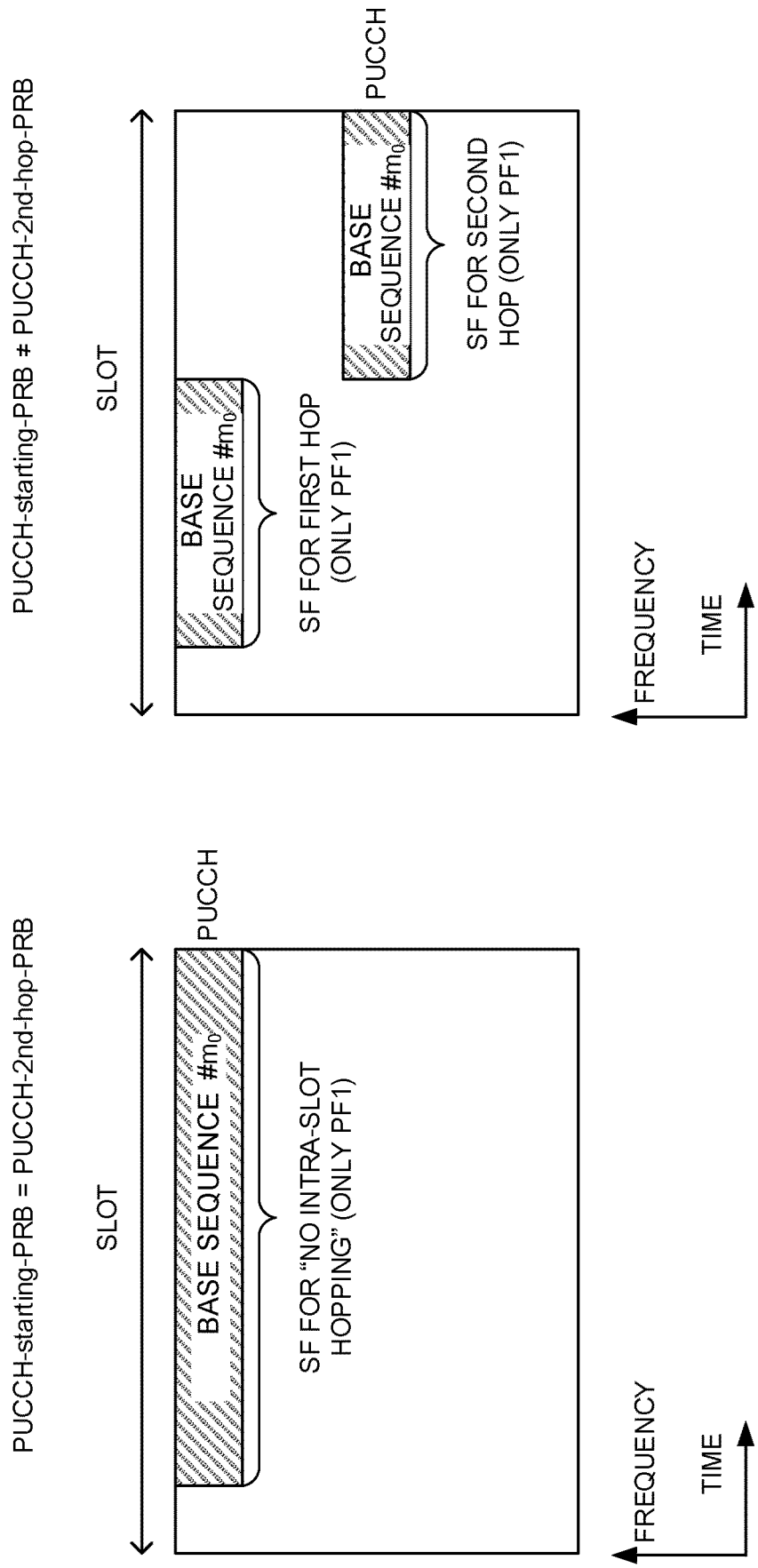
FIGS. 11A and 11B are diagrams to show an example of a method of determining the base sequence and the SF according to aspect 7-1.

When PUCCH-starting-PRB and PUCCH-2nd-hop-PRB are configured to be equal to each other, the UE may apply the SF for "no intra-slot hopping" regardless of whether PUCCH-frequency-hopping is enabled or disabled as shown in FIG. 11A.

The SF for "no intra-slot hopping" is larger than the SF for "intra-slot hopping" (each of the SF for the first hop and the SF for the second hop). By using the SF for "no intra-slot hopping", the OCC length is lengthened (the number of OCCs increases), compared to the case where the SF for "intra-slot hopping" is used. Therefore, it is possible to increase the OCC multiplexing capacity (the multiplexing capacity, the maximum number of the multiplexed UEs).

When PUCCH-starting-PRB and PUCCH-2nd-hop-PRB are configured to be different from each other, the UE may apply the SF for "intra-slot hopping" as shown in FIG. 11B.

The SF for "intra-slot hopping" (each of the SF for the first hop and the SF for the second hop) is smaller than the SF for "no intra-slot hopping". By using the SF for "intra-slot hopping", the OCC length is shortened, compared to the case where the SF for "no intra-slot hopping" is used. Therefore, a signal variation within the time-domain OCC during fast movement of the UE is reduced, and the orthogonality of the time-domain OCC is not easily degraded. Accordingly, robustness for fast movement of the UE is improved.

The UE uses one base sequence within one slot regardless of whether or not PUCCH-starting-PRB and PUCCH-2nd-hop-PRB are equal to each other. In other words, the base sequence does not change before and after the frequency hopping timing.

When PUCCH-starting-PRB and PUCCH-2nd-hop-PRB are configured to be different from each other, the UE may assume that PUCCH-frequency-hopping is not configured to "disabled" (configured to "enabled"). In addition, the UE may apply the SF for "intra-slot hopping" regardless of whether PUCCH-frequency-hopping is enabled or disabled when PUCCH-starting-PRB and PUCCH-2nd-hop-PRB are configured to be different from each other.

According to aspect 7-1, the NW can flexibly change the SF (OCC length) depending on whether or not PUCCH-starting-PRB and PUCCH-2nd-hop-PRB are equal to each other.

Aspect 7-2

In aspect 7-2, a case where the frequency-hop-level base sequence hopping is applied will be described.

Figures 12A, 12B:
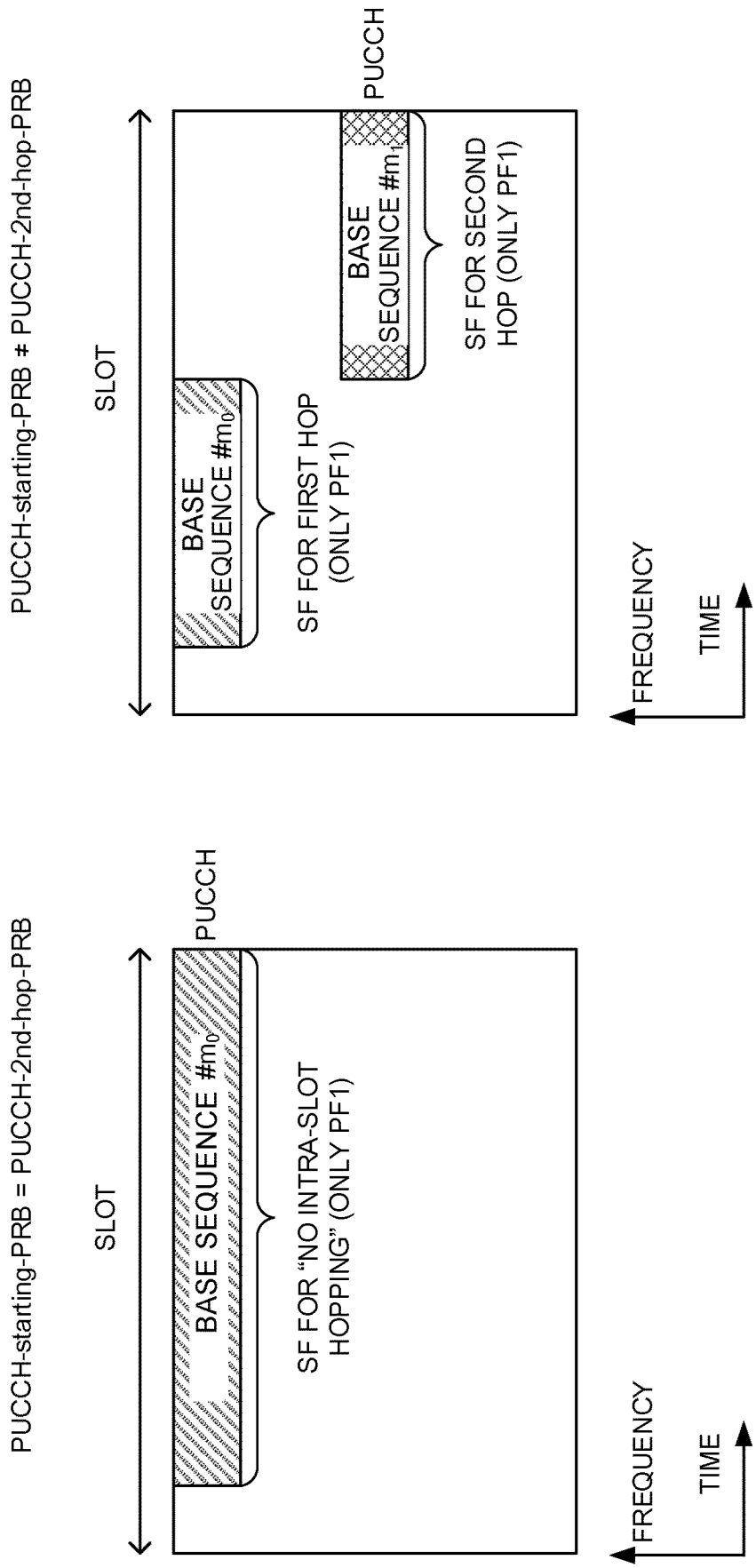
FIGS. 12A and 12B are diagrams to show an example of a method of determining the base sequence and the SF according to aspect 7-2.

When PUCCH-starting-PRB and PUCCH-2nd-hop-PRB are configured to be equal to each other, the UE may apply the SF for "no intra-slot hopping" regardless of whether PUCCH-frequency-hopping is enabled or disabled as shown in FIG. 12A.

The SF for "no intra-slot hopping" is larger than the SF for "intra-slot hopping" (each of the SF for the first hop and the SF for the second hop). By using the SF for "no intra-slot hopping", the OCC length is lengthened (the number of OCCs increases), compared to the case where the SF for "intra-slot hopping" is used. Therefore, it is possible to increase the OCC multiplexing capacity (the multiplexing capacity, the maximum number of the multiplexed UEs).

When PUCCH-starting-PRB and PUCCH-2nd-hop-PRB are configured to be equal to each other, the UE does not perform frequency hopping. Therefore, the frequency-hop-level base sequence hopping is not performed. Accordingly, the UE uses one base sequence within one slot.

When PUCCH-starting-PRB and PUCCH-2nd-hop-PRB are configured to be different from each other, the UE may apply the SF for "intra-slot hopping" as shown in FIG. 12B.

The SF for "intra-slot hopping" (each of the SF for the first hop and the SF for the second hop) is smaller than the SF for "no intra-slot hopping". By using the SF for "intra-slot hopping", the OCC length is shortened, compared to the case where the SF for "no intra-slot hopping" is used. Therefore, a signal variation within the time-domain OCC during fast movement of the UE is reduced, and the orthogonality of the time-domain OCC is not easily degraded. Accordingly, robustness for fast movement of the UE is improved.

When PUCCH-starting-PRB and PUCCH-2nd-hop-PRB are configured to be different from each other, the UE performs frequency hopping. Therefore, the base sequence hopping is performed (the base sequence is changed) at the frequency hopping timing for at least one of PUCCH formats 0 to 4.

Since the base sequence is changed within a slot, for example, a probability that a plurality of UEs use different base sequences increases at least before or after the frequency hopping (base sequence hopping). Therefore, a probability of interference of the base sequence is reduced, and robustness for inter-cell interference is improved.

When PUCCH-starting-PRB and PUCCH-2nd-hop-PRB are configured to be different from each other, the UE may assume that PUCCH-frequency-hopping is not configured to "disabled" (configured to "enabled"). In addition, when PUCCH-starting-PRB and PUCCH-2nd-hop-PRB are configured to be different from each other, the UE may apply the SF for "intra-slot hopping" regardless of whether PUCCH-frequency-hopping is enabled or disabled.

According to the seventh aspect, the NW can flexibly change the SF by using the frequency hopping configuration. In addition, the UE can suitably control the base sequence hopping on the basis of the frequency hopping configuration.

Since it is preferable that the same base sequence is used within one time-domain OCC, the slot-level or frequency-hop-level base sequence hopping is applied. Meanwhile, since the orthogonality of the time-domain OCC is not influenced even by changing the cyclic shift within one time-domain OCC, symbol-based hopping (symbol level) may be applied to the cyclic shift. Similar to the base sequence, the slot-level hopping or the frequency-hop-level cyclic shift hopping may be applied.

Radio Communication System

Hereinafter, a structure of a radio communication system according to one embodiment of the present invention will be described. In this radio communication system, the radio communication method according to each embodiment of the present invention described above may be used alone or may be used in combination for communication.

Figure 13:
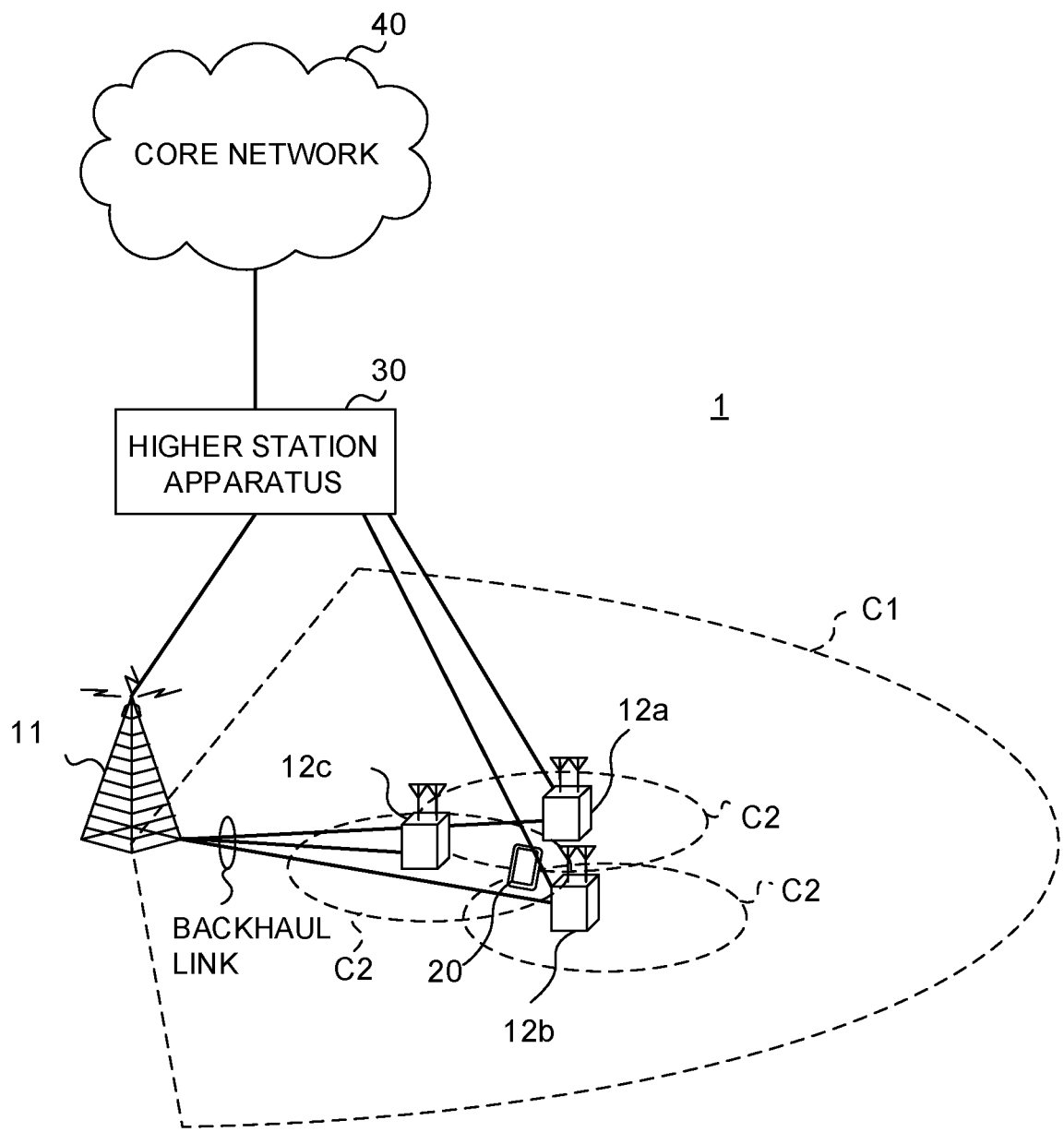
FIG. 13 is a diagram to show an example of a schematic structure of a radio communication system according to the present embodiment.

FIG. 13 is a diagram to show an example of a schematic structure of the radio communication system according to one embodiment of the present invention. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. The user terminals 20 may adopt CA or DC by using a plurality of cells (CCs) (for example, five or less CCs, or six or more CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

A wired connection (for example, means in compliance with the CPRI (Common Public Radio Interface) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands including one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. The MIBs (Master Information Blocks) are communicated on the PBCH.

The downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel) and so on. Downlink control information (DCI), including PDSCH and/or PUSCH scheduling information, and so on are communicated on the PDCCH.

Note that the scheduling information may be reported by the DCI. For example, the DCI scheduling DL data reception may be referred to as "DL assignment," and the DCI scheduling UL data transmission may be referred to as "UL grant."

The number of OFDM symbols to use for the PDCCH is communicated on the PCFICH. Delivery confirmation information (for example, also referred to as "retransmission control information," "HARQ-ACK," "ACK/NACK," and so on) of HARQ (Hybrid Automatic Repeat reQuest) to a PUSCH is transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio quality information (CQI (Channel Quality Indicator)) of the downlink, delivery confirmation information, a scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

Radio Base Station

Figure 14:
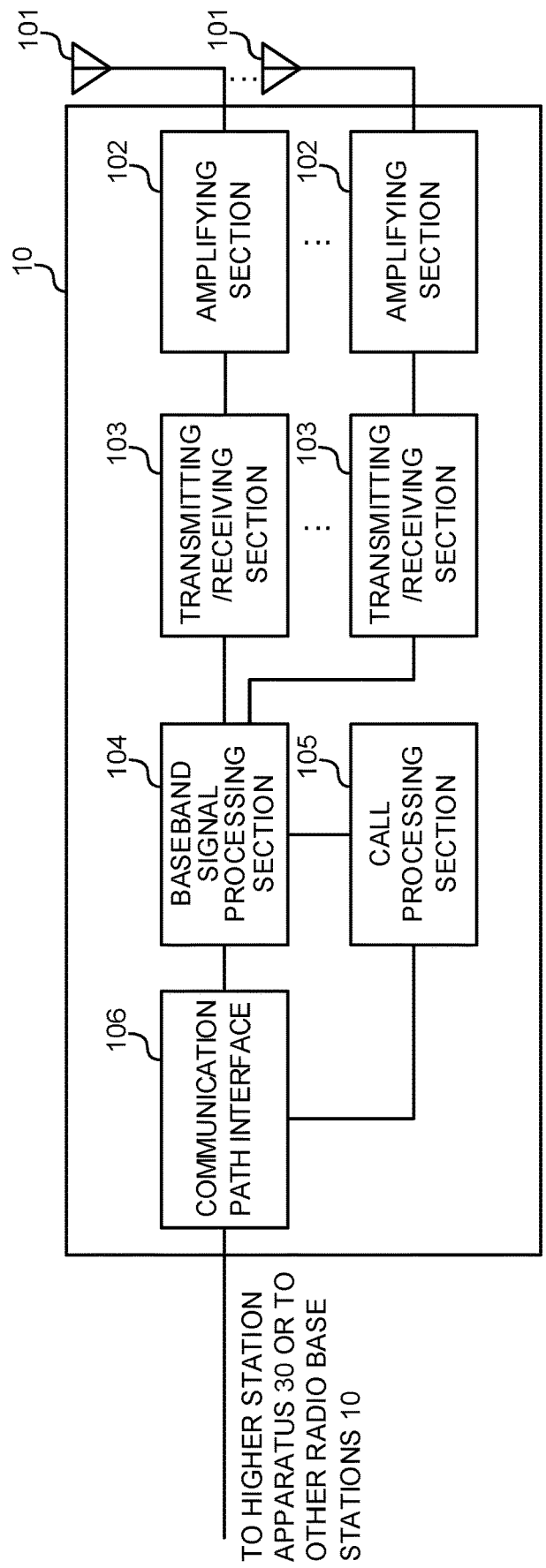
FIG. 14 is a diagram to show an example of an overall structure of a radio base station according to the present embodiment.

FIG. 14 is a diagram to show an example of an overall structure of the radio base station according to one embodiment of the present invention. A radio base station 10 includes a plurality of transmitting/receiving antennas 101, amplifying sections 102, transmitting/receiving sections 103, a baseband signal processing section 104, a call processing section 105 and a transmission line interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the transmission line interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present invention pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the transmission line interface 106. The call processing section 105 performs call processing (setting up, releasing and so on) for communication channels, manages the state of the radio base station 10, manages the radio resources and so on.

The transmission line interface 106 transmits and/or receives signals to and/or from the higher station apparatus 30 via a certain interface. The transmission line interface 106 may transmit and/or receive signals (backhaul signaling) with other radio base stations 10 via an inter-base station interface (for example, an optical fiber in compliance with the CPRI (Common Public Radio Interface) and an X2 interface).

The transmitting/receiving section 103 may transmit, to the user terminal 20, first frequency resource information (for example, PUCCH-starting-PRB) indicating a first frequency resource at a start of an uplink control channel (PUCCH) and second frequency resource information (for example, PUCCH-2nd-hop-PRB) indicating a second frequency resource after a frequency hopping timing of the uplink control channel. The transmitting/receiving section 103 may transmit, to the user terminal 20, frequency hopping information (PUCCH-frequency-hopping) indicating whether or not the frequency hopping is enabled.

Figure 15:
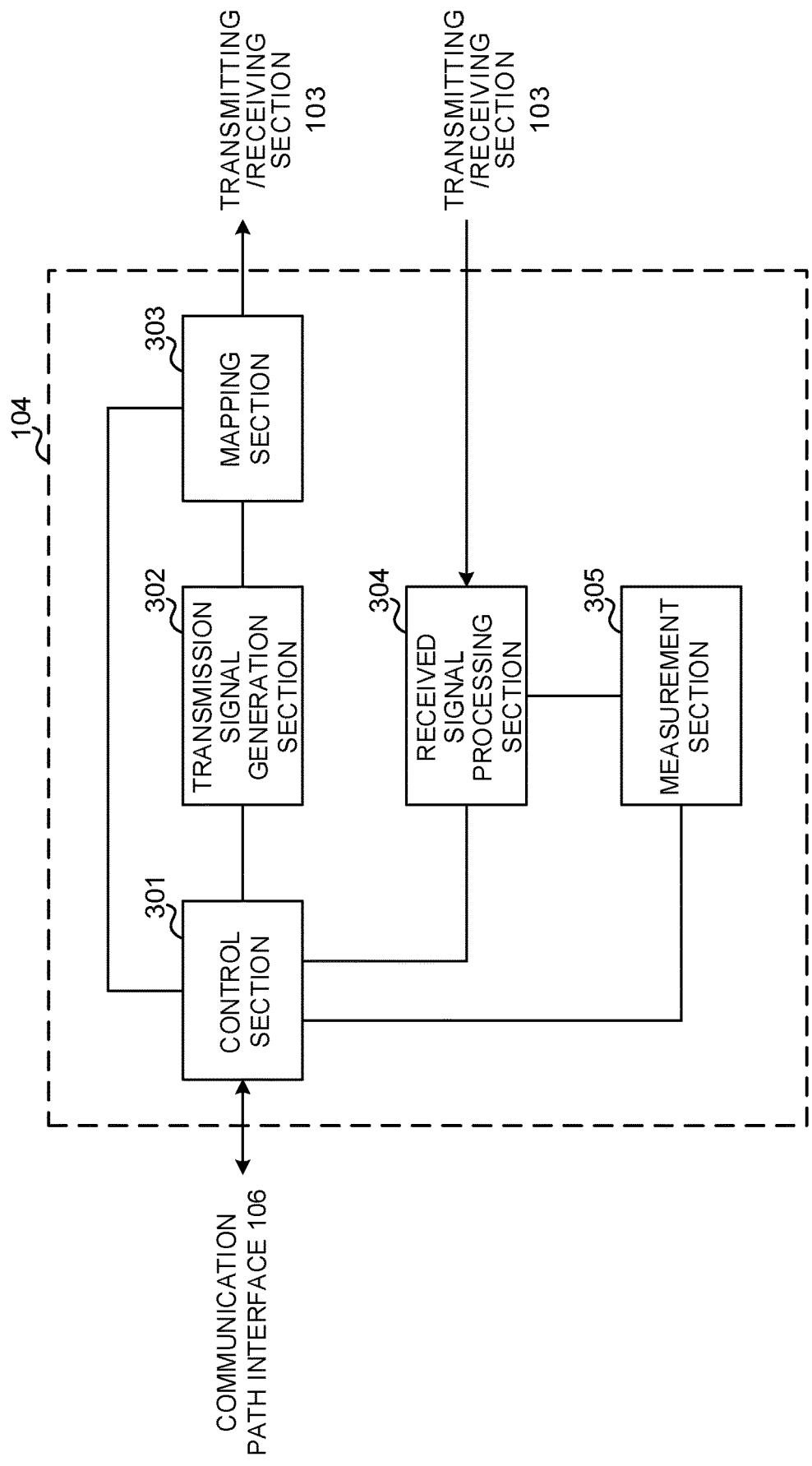
FIG. 15 is a diagram to show an example of a functional structure of the radio base station according to the present embodiment.

FIG. 15 is a diagram to show an example of a functional structure of the radio base station according to one embodiment of the present invention. Note that, the present example primarily shows functional blocks that pertain to characteristic parts of the present embodiment, and it is assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present invention pertains.

The control section 301, for example, controls the generation of signals by the transmission signal generation section 302, the mapping of signals by the mapping section 303, and so on. The control section 301 controls the signal receiving processes by the received signal processing section 304, the measurements of signals by the measurement section 305, and so on.

The control section 301 controls scheduling (for example, resource allocation) of system information, a downlink data signal (for example, a signal transmitted on a PDSCH), and a downlink control signal (for example, a signal transmitted on a PDCCH and/or an EPDCCH, delivery confirmation information, and so on). Based on the results of determining necessity or not of retransmission control to the uplink data signal, or the like, the control section 301 controls generation of a downlink control signal, a downlink data signal, and so on. The control section 301 controls the scheduling of a synchronization signal (for example, a PSS (Primary Synchronization Signal)/an SSS (Secondary Synchronization Signal)), a downlink reference signal (for example, a CRS, a CSI-RS, a DMRS), and so on.

The control section 301 controls scheduling of an uplink data signal (for example, a signal transmitted on a PUSCH), an uplink control signal (for example, a signal transmitted on a PUCCH and/or a PUSCH, delivery confirmation information, and so on), a random access preamble (for example, a signal transmitted on a PRACH), an uplink reference signal, and so on, The control section 301 may control reception of the uplink control channel (PUCCH) on the basis of the first frequency resource information and the second frequency resource information. The control section 301 may control reception of the uplink control channel (PUCCH) on the basis of the first frequency resource information, the second frequency resource information, and the frequency hopping information.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present invention pertains.

For example, the transmission signal generation section 302 generates DL assignment to report assignment information of downlink data and/or UL grant to report assignment information of uplink data, based on commands from the control section 301. The DL assignment and the UL grant are both DCI, and follow the DCI format. For a downlink data signal, encoding processing and modulation processing are performed in accordance with a coding rate, modulation scheme, or the like determined based on channel state information (CSI) from each user terminal 20.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present invention pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present invention pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality), an SINR (Signal to Interference plus Noise Ratio), a signal strength (for example, RSSI (Received Signal Strength Indicator)), channel information (for example, CSI), and so on. The measurement results may be output to the control section 301.

User Terminal

Figure 16:
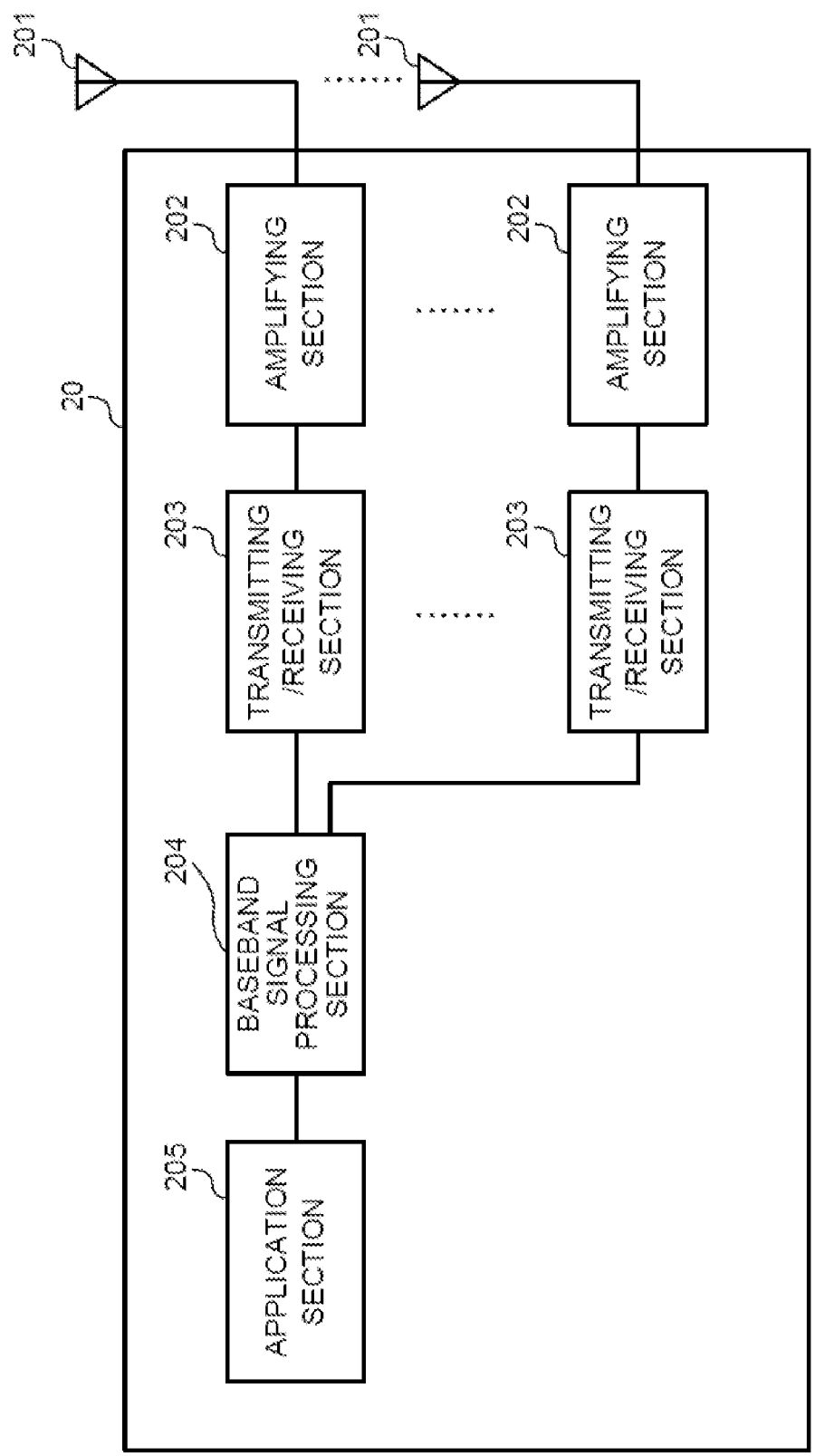
FIG. 16 is a diagram to show an example of an overall structure of a user terminal according to the present embodiment.

FIG. 16 is a diagram to show an example of an overall structure of a user terminal according to one embodiment of the present invention. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present invention pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

The transmitting/receiving section 203 may receive first frequency resource information (for example, PUCCH-starting-PRB) indicating a first frequency resource at a start of an uplink control channel (PUCCH) and second frequency resource information (for example, PUCCH-2nd-hop-PRB) indicating a second frequency resource after a frequency hopping timing of the uplink control channel. The transmitting/receiving section 203 may receive frequency hopping information (PUCCH-frequency-hopping) indicating whether or not the frequency hopping is enabled.

Figure 17:
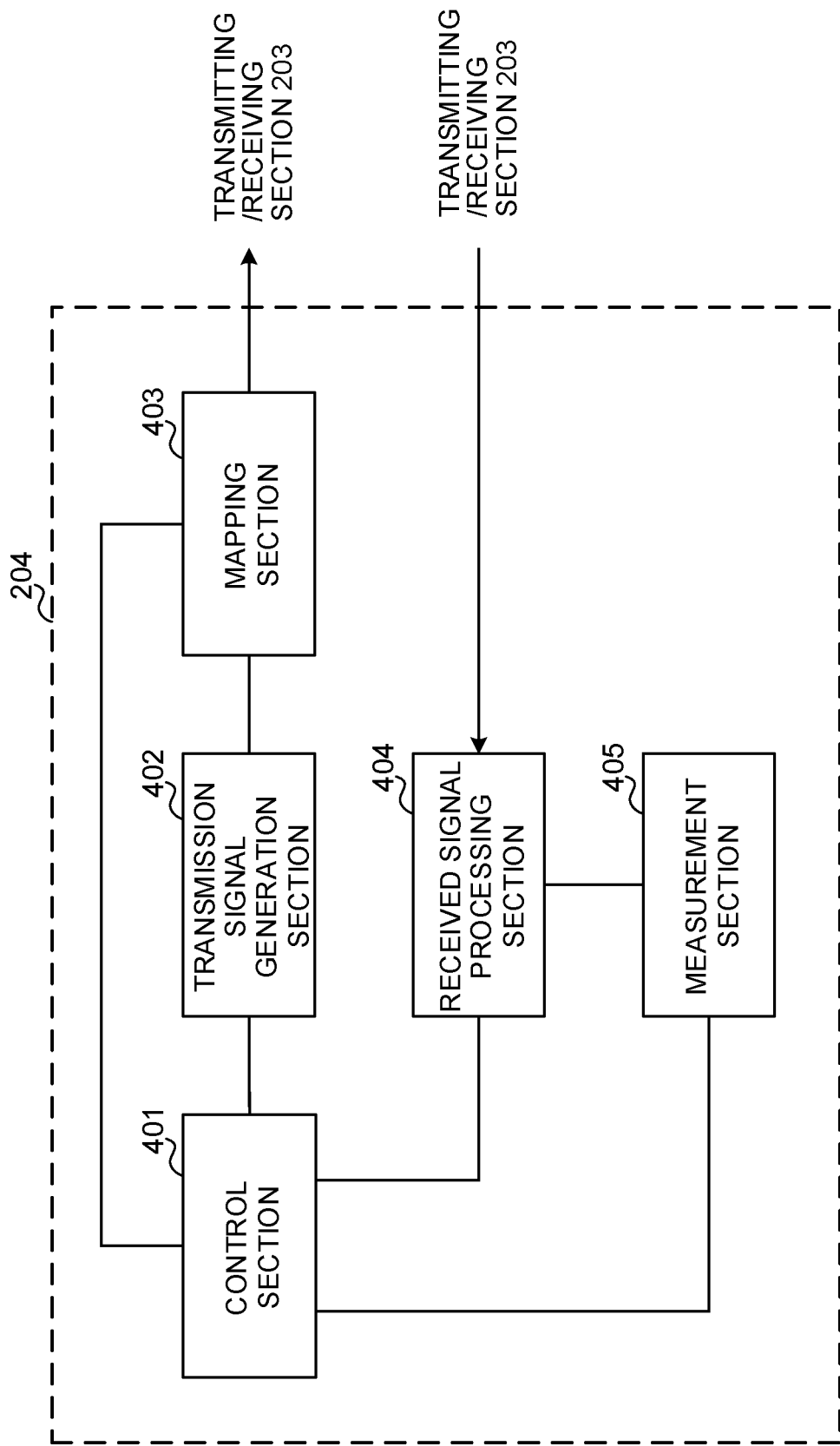
FIG. 17 is a diagram to show an example of a functional structure of the user terminal according to the present embodiment.

FIG. 17 is a diagram to show an example of a functional structure of a user terminal according to one embodiment of the present invention. Note that, the present example primarily shows functional blocks that pertain to characteristic parts of the present embodiment, and it is assumed that the user terminal 10 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present invention pertains.

The control section 401, for example, controls the generation of signals by the transmission signal generation section 402, the mapping of signals by the mapping section 403, and so on. The control section 401 controls the signal receiving processes by the received signal processing section 404, the measurements of signals by the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

The control section 401 may control transmission of the uplink control channel (PUCCH) on the basis of whether or not the second frequency resource indicated in the second frequency resource information (for example, PUCCH-2nd-hop-PRB) is identical to the first frequency resource indicated in the first frequency resource information (for example, PUCCH-starting-PRB).

The control section 401 may determine at least one of a spreading factor of a time-domain orthogonal cover code applied to the uplink control channel, a demodulation reference code format included in the uplink control channel, and a base sequence applied to the uplink control channel on the basis of whether or not the second frequency resource indicated in the second frequency resource information is identical to the first frequency resource indicated in the first frequency resource information, and the frequency hopping information (for example, PUCCH-frequency-hopping) (the first to third aspects).

The control section 401 may change the base sequence at the frequency hopping timing when the frequency hopping information indicates "enabled", and the second frequency resource indicated in the second frequency resource information is different from the first frequency resource indicated in the first frequency resource information (aspect 3-2 in the third aspect).

The control section 401 may determine whether or not the frequency hopping is applied on the basis of whether or not the second frequency resource indicated in the second frequency resource information is identical to the first frequency resource indicated in the first frequency resource information (the fourth aspect).

The control section 401 may determine at least one of a spreading factor of a time-domain orthogonal cover code applied to the uplink control channel, a demodulation reference signal configuration included in the uplink control channel, and a base sequence applied to the uplink control channel on the basis of whether or not the second frequency resource indicated in the second frequency resource information is identical to the first frequency resource indicated in the first frequency resource information (the fifth to seventh aspects).

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present invention pertains.

For example, the transmission signal generation section 402 generates an uplink control signal about delivery confirmation information, the channel state information (CSI), and so on, based on commands from the control section 401. The transmission signal generation section 402 generates uplink data signals, based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit or signal processing apparatus that can be described based on general understanding of the technical field to which the present invention pertains. The received signal processing section 404 can constitute the receiving section according to the present invention.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present invention pertains.

For example, the measurement section 405 may perform RRM measurement, CSI measurement, and so on, based on the received signal. The measurement section 405 may measure a received power (for example, RSRP), a received quality (for example, RSRQ, SINR), a signal strength (for example, RSSI), channel information (for example, CSI), and so on. The measurement results may be output to the control section 401.

Hardware Structure

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these plurality of pieces of apparatus.

Figure 18:
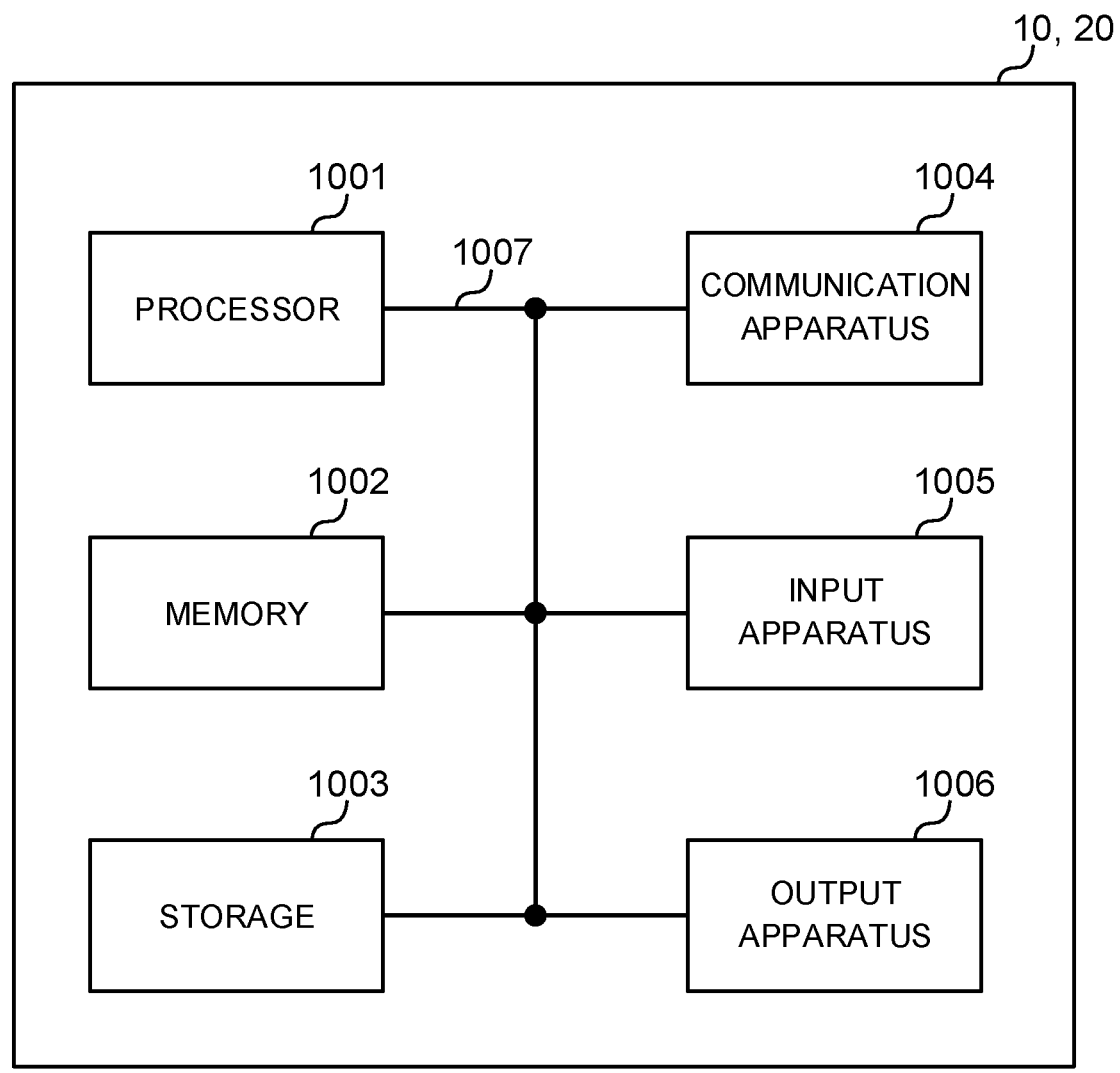
FIG. 18 is a diagram to show an example of a hardware structure of the radio base station and the user terminal according to the present embodiment.

For example, a radio base station, a user terminal, and so on according to one embodiment of the present invention may function as a computer that executes the processes of the radio communication method of the present invention. FIG. 18 is a diagram to show an example of a hardware structure of the radio base station and the user terminal according to one embodiment of the present invention.

Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control reading and/or writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present invention.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via a wired and/or wireless network, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), transmission line interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

Variations

Note that the terminology described in this specification and/or the terminology that is needed to understand this specification may be replaced by other terms that convey the same or similar meanings. For example, "channels" and/or "symbols" may be "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Furthermore, a slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI" or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks, and/or codewords are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (PRB (Physical RB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to certain values, or may be represented in another corresponding information. For example, radio resources may be specified by certain indices.

The names used for parameters and so on in this specification are in no respect limiting. For example, since various channels (PUCCH (Physical Uplink Control Channel), PDCCH (Physical Downlink Control Channel), and so on) and information elements can be identified by any suitable names, the various names allocated to these various channels and information elements are in no respect limiting.

The information, signals, and so on described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers, and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" used in this specification can be used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of a base station and/or a base station subsystem that provides communication services within this coverage.

In the present specification, the terms "mobile station (MS)," "user terminal," "user equipment (UE)," and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second" and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up, (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions and/or (both visible and invisible) optical regions, or the like.

In this specification, the phrase "A and B are different" may mean that "A and B are different from each other." The terms "separate," "be coupled" and so on may be interpreted similarly.

When terms such as "including," "comprising," and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described in this specification. The present invention can be implemented with various corrections and in various modifications, without departing from the spirit and scope of the present invention defined by the recitations of claims. Consequently, the description in this specification is provided only for the purpose of explaining examples, and should by no means be construed to limit the present invention in any way.

What is claimed is:

1. A terminal comprising:
   a receiver configured to receive a physical control channel (PUCCH) resource configuration; and
   a processor configured to use different base sequences for a PUCCH between a first hop and a second hop if the PUCCH resource configuration indicates:
      that intra-slot frequency hopping is enabled,
      a starting physical resource block (PRB) that is a first PRB in the first hop, and
      a second hop PRB that is a first PRB in the second hop, even when the second hop PRB is equal to the starting PRB.

2. The terminal according to claim 1, wherein even when the second hop PRB is equal to the starting PRB, the processor uses, in PUCCH format 1, an orthogonal sequence having a length that differs depending on whether the PUCCH resource configuration indicates that the frequency hopping is enabled.

3. The terminal according to claim 2, wherein even when the second hop PRB is equal to the starting PRB, the processor determines a position of a demodulation reference signal for PUCCH format 3 based on whether the PUCCH resource configuration indicates that the frequency hopping is enabled.

4. The terminal according to claim 2, wherein even when the second hop PRB is equal to the starting PRB, the processor determines a position of a demodulation reference signal for PUCCH format 4 based on whether the PUCCH resource configuration indicates that the frequency hopping is enabled.

5. The terminal according to claim 2, wherein the processor uses each base sequence for at least one of an uplink control information and a demodulation reference signal.

6. The terminal according to claim 2, wherein at least one of an uplink control information and a demodulation reference signal uses a low-peak to average power ratio (low-PAPR) sequence.

7. The terminal according to claim 1, wherein even when the second hop PRB is equal to the starting PRB, the processor determines a position of a demodulation reference signal for PUCCH format 3 based on whether the PUCCH resource configuration indicates that the frequency hopping is enabled.

8. The terminal according to claim 7, wherein the processor uses each base sequence for at least one of an uplink control information and a demodulation reference signal.

9. The terminal according to claim 7, wherein at least one of an uplink control information and a demodulation reference signal uses a low-peak to average power ratio (low-PAPR) sequence.

10. The terminal according to claim 1, wherein the processor uses each base sequence for at least one of an uplink control information and a demodulation reference signal.

11. The terminal according to claim 10, wherein at least one of an uplink control information and a demodulation reference signal uses a low-peak to average power ratio (low-PAPR) sequence.

12. The terminal according to claim 1, wherein at least one of an uplink control information and a demodulation reference signal uses a low-peak to average power ratio (low-PAPR) sequence.

13. The terminal according to claim 1, wherein even when the second hop PRB is equal to the starting PRB, the processor determines a position of a demodulation reference signal for PUCCH format 4 based on whether the PUCCH resource configuration indicates that the frequency hopping is enabled.

14. A radio communication method for a terminal comprising:
   receiving a physical control channel (PUCCH) resource configuration; and
   using different base sequences for a PUCCH between a first hop and a second hop if the PUCCH resource configuration indicates:
      that intra-slot frequency hopping is enabled,
      a starting physical resource block (PRB) that is a first PRB in the first hop, and
      a second hop PRB that is a first PRB in the second hop, even when the second hop PRB is equal to the starting PRB.

15. A base station comprising:
   a transmitter configured to transmit a physical control channel (PUCCH) resource configuration; and
   a processor configured to use different base sequences for receiving a PUCCH between a first hop and a second hop if the PUCCH resource configuration indicates:
      that intra-slot frequency hopping is enabled,
      a starting physical resource block (PRB) that is a first PRB in the first hop, and
      a second hop PRB that is a first PRB in the second hop, even when the second hop PRB is equal to the starting PRB.

* * * * *